(12) United States Patent
Morio et al.

(10) Patent No.: US 9,341,241 B2
(45) Date of Patent: May 17, 2016

(54) DRIVE APPARATUS FOR HYBRID VEHICLE

(71) Applicant: Aisin Seiki Kabushiki Kaisha, Kariya-shi (JP)

(72) Inventors: Toshiyuki Morio, Nagoya (JP); Yoshiyuki Onimaru, Nagoya (JP); Kozo Nakagawa, Nishio (JP); Takahiro Misu, Nagoya (JP); Kuniaki Kuwahara, Chita-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/567,104

(22) Filed: Dec. 11, 2014

(65) Prior Publication Data
US 2015/0167794 A1    Jun. 18, 2015

(30) Foreign Application Priority Data

Dec. 16, 2013  (JP) ................. 2013-259271

(51) Int. Cl.
| | |
|---|---|
| *F16H 3/72* | (2006.01) |
| *B60K 6/365* | (2007.10) |
| *B60K 6/48* | (2007.10) |
| *B60K 6/547* | (2007.10) |

(Continued)

(52) U.S. Cl.
CPC ............... *F16H 3/724* (2013.01); *B60K 6/365* (2013.01); *B60K 6/48* (2013.01); *B60K 6/547* (2013.01); *F16H 3/78* (2013.01); *B60K 2006/4816* (2013.01); *F16H 3/725* (2013.01); *F16H 2061/0422* (2013.01); *F16H 2200/0052* (2013.01); *F16H 2200/0082* (2013.01); *F16H 2200/201* (2013.01); *F16H 2200/2012* (2013.01); *F16H 2200/2043* (2013.01); *Y02T 10/6221* (2013.01); *Y02T 10/6256* (2013.01); *Y02T 10/7258* (2013.01); *Y10S 903/919* (2013.01)

(58) Field of Classification Search
None
See application file for complete search history.

(56) References Cited

U.S. PATENT DOCUMENTS

| | | | | |
|---|---|---|---|---|
| 4,027,552 A | * | 6/1977 | Murakami | ............. F16H 3/666 475/280 |
| 4,070,927 A | | 1/1978 | Polak | |

(Continued)

FOREIGN PATENT DOCUMENTS

JP        2009-107388        5/2009

OTHER PUBLICATIONS

Extended European Search Report issued May 4, 2015 in Patent Appplication No. 14197642.3.

*Primary Examiner* — Justin Holmes
(74) *Attorney, Agent, or Firm* — Oblon, McClelland, Maier & Neustadt, L.L.P

(57) ABSTRACT

A drive apparatus for a hybrid vehicle includes: an engine applying a drive force to drive wheels via a drive shaft; a motor applying a drive force to the drive wheels via a rotation shaft; a planetary gear mechanism having first, second, and third elements lining up sequentially with a gap interposed therebetween corresponding to a gear ratio; and an automatic transmission having input and output shafts rotatably connected to the drive wheels, and changing a gear ratio obtained by the division of the rotation speed of the input shaft by the rotation speed of the output shaft, wherein the input and drive shafts are connected to the second element, the output shaft and one end of the rotation shaft are connected to the first element, and the output shaft and the other end of the rotation shaft are connected to the third element.

6 Claims, 16 Drawing Sheets

(51) Int. Cl.
*F16H 3/78* (2006.01)
*F16H 61/04* (2006.01)

(56) References Cited

U.S. PATENT DOCUMENTS

| | | | |
|---|---|---|---|
| 5,730,675 A | 3/1998 | Yamaguchi | |
| 5,895,333 A * | 4/1999 | Morisawa | B60K 6/24 475/5 |
| 2007/0129203 A1 | 6/2007 | Raghavan et al. | |
| 2007/0191176 A1 * | 8/2007 | Gumpoltsberger | F16H 3/66 475/282 |
| 2007/0298932 A1 * | 12/2007 | Yoneyama | F16H 61/12 477/120 |
| 2011/0124463 A1 | 5/2011 | Sugino | |
| 2011/0312461 A1 | 12/2011 | Park | |
| 2012/0122622 A1 * | 5/2012 | Turnbull | B60K 6/48 475/5 |
| 2015/0011352 A1 * | 1/2015 | Beck | B60K 6/48 475/275 |

* cited by examiner

FIG.2

| | C1 | C2 | B1 | B2 | B3 |
|---|---|---|---|---|---|
| N | | | | | ○ |
| 1st | ○ | | | | ○ |
| 2nd | ○ | | | | |
| 3rd | ○ | | | ○ | |
| 4th | | ○ | | | |
| 5th | | ○ | ○ | | |
| 6th | | ○ | ○ | ○ | |
| Rev | | | ○ | | ○ |

FIG.14

|  | Cl1 | Cl2 | B1 | B2 |
|---|---|---|---|---|
| 1st |  |  | ○ | ○ |
| 2nd | ○ |  |  | ○ |
| 3rd |  | ○ |  | ○ |
| 4th | ○ | ○ |  |  |
| 5th |  | ○ | ○ |  |
| Rev | ○ |  | ○ |  |

FIG.16

| | C1 | C2 | B1 | B2 | B3 |
|---|---|---|---|---|---|
| N | | | | | |
| 1st | | | | | ○ |
| 2nd | | | | ○ | ○ |
| 3rd | | | ○ | | ○ |
| 4th | ○ | | | | ○ |
| 5th | ○ | ○ | ○ | | |
| 6th | ○ | | | | |
| Rev | | ○ | | ○ | |

DRIVE APPARATUS FOR HYBRID VEHICLE

CROSS REFERENCE TO RELATED APPLICATIONS

This application is based on and claims priority under 35 U.S.C. §119 to Japanese Patent Application 2013-259271, filed on Dec. 16, 2013, the entire contents of which are incorporated herein by reference.

TECHNICAL FIELD

This disclosure relates to a drive apparatus for a hybrid vehicle of which are driven by an engine and a motor.

BACKGROUND DISCUSSION

In the related art, JP 2009-107388A (Reference 1) discloses a drive apparatus for a hybrid vehicle in which an engine and a motor are connected to elements of two planetary gear mechanisms. The drive apparatus for a hybrid vehicle can synchronize rotation during the launch and the shifting of the transmission of a vehicle by controlling the motor, and does not require a torque converter.

However, in the drive apparatus for a hybrid vehicle disclosed in Reference 1, when a gear stage is a second speed stage or an eighth speed stage, the motor is locked by the brakes, and thereby the motor cannot provide the vehicle with an assist drive force. The rotation speed of the engine decreases as the gear stage is up-shifted from a second speed stage to a third speed stage, to a fourth speed stage, and to a fifth speed stage, but the rotation speed of the motor increases. For this reason, there is a problem in that in the gear stages from the second speed stage to the fifth speed stage, the torque of the motor does not increase sufficiently, and the motor cannot be of assistance to the driving of the vehicle because a speed reduction ratio decreases further as the gear stage decreases. In contrast, the rotation speed of the motor decreases as the gear stage is up-shifted from a fifth speed stage to a sixth speed stage, to a seventh speed stage, and to an eighth speed stage. As such, from the second speed stage to the fifth speed stage, the speed reduction ratio increases, and in contrast, there is a problem in that the gear ratio cannot adjust a drive force output from the motor to an appropriate level of torque because the speed reduction ratio decreases from the fifth speed stage to the eighth speed stage.

SUMMARY

Thus, a need exists for a drive apparatus for a hybrid vehicle which is not suspectable to the drawback mentioned above.

A first aspect of this disclosure is directed to a drive apparatus for a hybrid vehicle including: an engine that applies a drive force to drive wheels via a drive shaft; a motor that applies a drive force to the drive wheels via a rotation shaft; a planetary gear mechanism that has a first element, a second element, and a third element which line up sequentially with a gap interposed therebetween corresponding to a gear ratio in a speed diagram; and an automatic transmission that has an input shaft, and an output shaft rotatably connected to the drive wheels, and changes a gear ratio that is obtained by the division of the rotation speed of the input shaft by the rotation speed of the output shaft. The input shaft and the drive shaft are connected to the second element, the output shaft and one end of the rotation shaft are connected to the first element, and the other end of the rotation shaft are connected to the third element.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a table illustrating an operation state of each of brakes and clutches in each gear stage of an automatic transmission of the first embodiment;

FIG. 14 is a table illustrating an operation state of each of brakes and clutches in each gear stage of an automatic transmission of the second embodiment;

FIG. 16 is a table illustrating an operation state of each of brakes and clutches in each gear stage of an automatic transmission of the third embodiment.

DETAILED DESCRIPTION

Drive Apparatus for Hybrid Vehicle of First Embodiment

Figure 1:
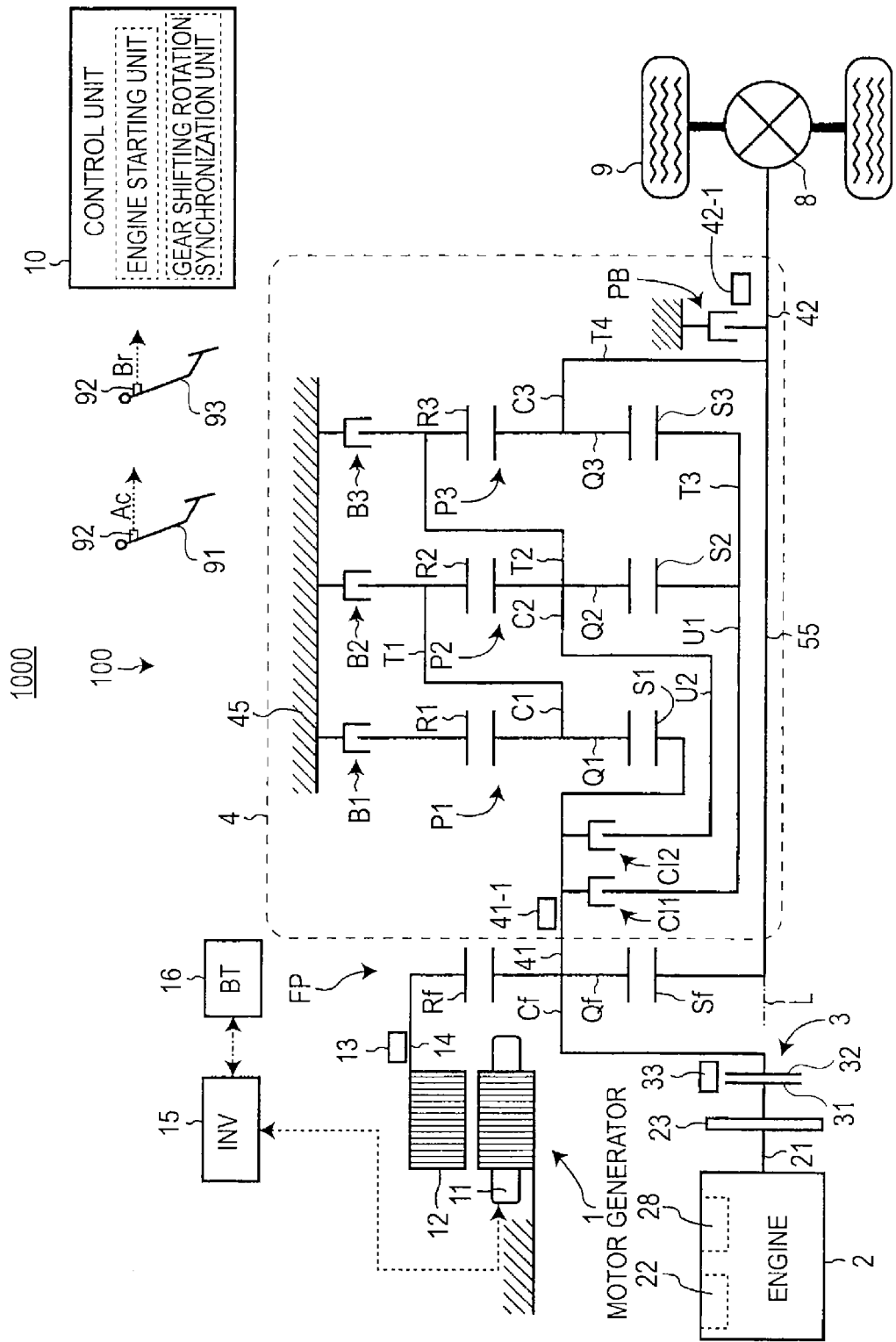
FIG. 1 is a diagram illustrating a hybrid vehicle equipped with a drive apparatus for a hybrid vehicle of a first embodiment.

A drive apparatus 100 for a hybrid vehicle (hereinafter, as necessary, simply referred to as a drive apparatus 100) of a first embodiment mounted in a hybrid vehicle 1000 (hereinafter, simply referred to as a vehicle 1000) will be described with reference to FIG. 1. The drive apparatus 100 has a motor generator 1; an engine 2; a clutch 3; an automatic transmission 4; and a planetary gear mechanism FP.

The motor generator 1 outputs a drive force to drive wheels 9 of the vehicle 1000, and applies a regenerative braking force to the drive wheels 9 by regenerating the kinetic energy of the vehicle 1000 as electrical energy. The motor generator 1 has a stator 11; a rotor 12 that rotates with respect to the stator 11; and a rotation shaft 14 that is connected to the rotor 12. A motor generator rotation speed sensor 13 is provided adjacent to the rotor 12 or the rotation shaft 14, and detects the rotation speed of the rotor 12 or the rotation shaft 14 (hereinafter, simply referred to as a motor generator rotation speed Nmg).

The engine 2 outputs a drive force to the drive wheels 9. The engine 2 is a gasoline engine, a diesel engine or the like which uses hydrocarbon-based fuel such as gasoline or diesel. The engine 2 has a drive shaft 21; a throttle valve 22; a flywheel 23; and a fuel injection device 28, and is controlled by a control unit 10. When the engine 2 is a gasoline engine, a cylinder head of the engine 2 is provided with an ignition device (not illustrated) for igniting an air-fuel mixture in a cylinder of the engine 2.

The drive shaft 21 rotates integrally with a crankshaft that is rotatably driven by pistons, and outputs torque. The throttle valve 22 is provided in the middle of a path through which air is suctioned into the cylinder of the engine 2. The throttle valve 22 regulates the amount of air suctioned into the cylinder of the engine 2. The flywheel 23 is rotatably connected to the drive shaft 21. The flywheel 23 has a predetermined moment of inertia, and stores and discharges kinetic energy in association with the rotation thereof. The fuel injection device 28 is provided in the middle of a path through which air is suctioned into the engine 2, or in the cylinder head of the engine 2. The fuel injection device 28 is a device for injecting fuel such as gasoline or diesel.

The clutch 3 connects or disconnects the drive shaft 21 of the engine 2 and a carrier Cf of the planetary gear mechanism FP. A wet multiple disc friction clutch or a dry single disc friction clutch can be used as the clutch 3. The clutch 3 has a drive member 31; a driven member 32; and a clutch actuator 33. The drive member 31 is connected to the drive shaft 21. The driven member 32 is connected to the carrier Cf of the planetary gear mechanism FP. The clutch actuator 33 switches between states of connection and disconnection of the drive member 31 and the driven member 32.

The automatic transmission 4 is a stepped transmission that is shifted by forming a gear stage of a plurality of gear stages having different gear ratios, each of which is a result of the division of the rotation speed of an input shaft 41 by the rotation speed of an output shaft 42, and by changing the gear ratio. The structure of the automatic transmission 4 will be described in detail later.

A differential 8 is connected to the output shaft 42, and absorbs differential motion between a pair of drive wheels 9. The drive wheels 9 are connected to the differential 8.

The planetary gear mechanism FP has a first element, a second element, and a third element which line up sequentially in a speed diagram with a gap corresponding to a gear ratio interposed therebetween. In the embodiment, the planetary gear mechanism FP is a single pinion type, and includes a sun gear Sf; a pinion gear Qf; the carrier Cf; and a ring gear Rf. The first element is the sun gear Sf, the second element is the carrier Cf, and the third element is the ring gear Rf. The sun gear Sf is rotatably provided on a rotational axis line L. A plurality of the pinion gears Qf are provided on the circumference of the sun gear Sf, and mesh with the sun gear Sf. The plurality of pinion gears Qf are rotatably supported by the carrier Cf. The ring gear Rf has a ring shape, and an inner circumferential portion of the ring gear Rf meshes with the plurality of pinion gears Qf.

The carrier Cf is connected to the driven member 32, and is connected to the drive shaft 21 of the engine 2 via the clutch 3. The carrier Cf is also connected to the input shaft 41 of the automatic transmission 4. The sun gear Sf is connected to the output shaft 42 via a connecting member 55. The rotation shaft 14 of the motor generator 1 is connected to the ring gear Rf.

An accelerator pedal 91 and a brake pedal 93 are pivotably attached in a driver's cab of the vehicle 1000. An accelerator pedal sensor 92 is provided adjacent to the accelerator pedal 91 so as to detect an accelerator pedal opening Ac that is the amount of operation of the accelerator pedal 91, and to output the acceleration pedal opening Ac to the control unit 10. A brake pedal sensor 94 is provided adjacent to the brake pedal 93 so as to detect the amount of braking Br that is the amount of operation of the brake pedal 93, and to output the amount of braking Br to the control unit 10.

An inverter device 15 is electrically connected to the stator 11 and a battery 16. The inverter device 15 is communicably connected to the control unit 10. The inverter device 15 boosts direct current supplied from the battery 16, converts the direct current into alternating current, and supplies the alternating current to the stator 11, based on a control signal from the control unit 10, and thereby this results in the motor generator 1 functioning as a motor that generates torque. The inverter device 15 causes the motor generator 1 to function as a generator based on a control signal from the control unit 10, and thereby the inverter device 15 converts alternating current generated by the motor generator 1 into direct current, decreases a voltage, and charges the battery 16.

Overall, the control unit 10 controls the vehicle 1000. The control unit 10 has an ECU. The ECU includes input/output interfaces, a CPU, a RAM, a "storage unit" such as a non-volatile memory, and the like which are connected to each other via buses. The CPU executes a program corresponding to flowcharts illustrated in FIGS. 5, 6, 8, and 10. The RAM temporarily stores variables necessary for executing the same program, and the "storage unit" stores detected values from various sensors and the program. The control unit 10 may be configured to include a single ECU, or may be configured to include a plurality of ECU's.

The control unit 10 computes a "demand torque" based on the accelerator pedal opening Ac output from the accelerator pedal sensor 92, and a vehicle speed V. The control unit 10 computes a "demand motor torque" outputable from the motor generator 1, based on a charging state of the battery 16 and the vehicle speed V. The control unit 10 computes a "demand engine torque" from the "demand torque" and the "demand motor torque".

The control unit 10 regulates the amount of suction air by regulating an opening S of the throttle valve 22 based on the "demand engine torque", regulates the amount of injection fuel of the fuel injection device 28, and controls the ignition device. Accordingly, the amount of supply of an air-fuel mixture containing fuel is regulated, and engine torque Te output from the engine 2 is controlled to be the "demand engine torque".

The control unit 10 controls the switching between a drive mode and a power generation mode of the motor generator 1, and motor torque output from the motor generator 1, by controlling the inverter device 15. The control unit 10 controls the inverter device 15 in order for the battery 16 to supply drive electrical power to the motor generator 1, and controls the frequency and the root mean square value of the drive electrical power to be variable, based on the "demand motor torque", and thereby motor torque Tm output from the motor generator 1 is controlled to be the "demand motor torque".

Structure of Automatic Transmission

The automatic transmission 4 has the input shaft 41; the output shaft 42; planetary gear mechanisms P1 to P3; clutches Cl1 and Cl2; brakes B1 to B3; an input shaft rotation speed sensor 41-1; an output shaft rotation speed sensor 42-1; and a parking brake PB. The operation of each of engagement elements formed of the clutches Cl1 and Cl2 and the brakes B1 to B3 is controlled based on a control signal from the control unit 10. In the embodiment, the automatic transmission 4 forms any gear stage of six forward speed stages and one reverse speed stage by operating two engagement elements of the above-mentioned engagement elements.

A housing 45 supports the input shaft 41 and the output shaft 42 so that the input shaft 41 and the output shaft 42 can rotate about the rotational axis line L. The input shaft 41 has a circular cylindrical shape, and is provided on an outer circumferential side of the connecting member 55 so as to be coaxial with the connecting member 55 that is supported so as to rotatable about the rotational axis line L.

Each of the planetary gear mechanisms P1 to P3 is a single pinion planetary gear mechanism, in which pinion gears Q1 to Q3 rotatably supported by carriers C1 to C3 mesh respectively with sun gears S1 to S3 and ring gears R1 to R3. The planetary gear mechanisms in sequence from an input side are respectively referred to as a first planetary gear mechanism P1, a second planetary gear mechanism P2, and a third planetary gear mechanism P3. The elements of the planetary gear mechanism P1 are referred to as a first sun gear S1, a first ring gear R1, and a first carrier C1, the elements of the planetary gear mechanism P2 are referred to as a second sun gear S2, a second ring gear R2, and a second carrier C2, and the elements of the planetary gear mechanism P3 are referred to as a third sun gear S3, a third ring gear R3, and a third carrier C3.

The first planetary gear mechanism P1 includes the first sun gear S1 that is supported so as to be rotatable coaxially about the rotational axis line L; the first ring gear R1; and the first carrier C1 that supports the first pinion gear Q1 meshing with the first sun gear S1 and the first ring gear R1.

The second planetary gear mechanism P2 includes the second sun gear S2 that is supported so as to be rotatable coaxially about the rotational axis line L; the second ring gear R2; and the second carrier C2 that supports the second pinion gear Q2 meshing with the second sun gear S2 and the second ring gear R2.

The third planetary gear mechanism P3 includes the third sun gear S3 that is supported so as to be rotatable coaxially about the rotational axis line L; the third ring gear R3; and the third carrier C3 that supports the third pinion gear Q3 meshing with the third sun gear S3 and the third ring gear R3.

The first carrier C1 and the second ring gear R2 are connected to each other via a first connecting member T1. The second carrier C2 and the third ring gear R3 are connected to each other via a second connecting member T2. The second sun gear S2 and the third sun gear S3 are connected to each other via a third connecting member T3. The third carrier C3 and the output shaft 42 are connected to each other via a fourth connecting member T4.

The brakes B1 to B3 are provided in the housing 45, and are engagement elements, each of which brakes the rotation of a predetermined rotating element. In the embodiment, similar to the clutches Cl1 and Cl2, each of the brakes B1 to B3 is a hydraulic brake which is operated by the pressure of oil supplied from an oil path formed in the housing 45. When hydraulic pressure is supplied to each of the brakes B1 to B3 by a hydraulic pump that operates based on a control instruction from the control unit 10, each of the brakes B1 to B3 brakes the rotation of a predetermined target rotating element by pressing a pad against a disc which are not illustrated. When the supply of the hydraulic pressure from the hydraulic pump is shut off, each of the brakes B1 to B3 separates the pad from the disc, and allows the rotation of the predetermined rotating element.

Each of the clutches Cl1 and Cl2 is an engagement element that can selectively connect a plurality of rotating elements. In the embodiment, each of the clutches Cl1 and Cl2 is a normally open clutch, and is a hydraulic clutch that is operated by hydraulic pressure supplied thereto. Accordingly, when a hydraulic pump operates to supply hydraulic pressure to each of the clutches Cl1 and Cl2 via an oil path formed in the input shaft 41 or the housing 45, based on a control instruction from the control unit 10, each of the clutches Cl1 and Cl2 brings a plurality of clutch discs (not illustrated) into contact with each other, and connects target rotating elements in order for torque to be transmitted between the target rotating elements. When the supply of the hydraulic pressure from the hydraulic pump is shut off, each of the clutches Cl1 and Cl2 separates the clutch discs from each other, and disengages the target rotating elements in order for torque not to be transmitted between the target rotating elements.

A first brake B1 brakes the rotation of the first ring gear R1. A second brake B2 brakes the rotation of the first carrier C1 and the second ring gear R2. A third brake B3 brakes the rotation of the second carrier C2 and the third ring gear R3.

The first clutch Cl1 engageably and disengageably connects the input shaft 41, and the second sun gear S2 and the third sun gear S3 via a first clutch connecting member U1 connected to the third connecting member T3, in which the second sun gear S2 and the third sun gear S3 are connected to each other.

The second clutch Cl2 engageably and disengageably connects the input shaft 41, and the second carrier C2 and the third ring gear R3 via a second clutch connecting member U2 connected to the second carrier C2 in which the second carrier C2 and the third ring gear R3 are connected to each other.

The input shaft rotation speed sensor 41-1 is provided adjacent to the input shaft 41 so as to detect the rotation speed of the input shaft 41 (hereinafter, referred to as an input shaft rotation speed Ni), and to output a detection signal to the control unit 10. The output shaft rotation speed sensor 42-1 is provided adjacent to the output shaft 42 so as to detect the rotation speed of the output shaft 42 (hereinafter, referred to as an output shaft rotation speed No), and to output a detection signal to the control unit 10.

When a shift lever (not illustrated) moves to a parking position, the parking brake PB locks the output shaft 42 to the housing 45, and thereby the output shaft 42 becomes non-rotatable. When the shift lever moves from the parking position to any position other than the parking position, the parking brake PB allows the output shaft 42 in a non-rotatable state to rotate.

Operation of Automatic Transmission of First Embodiment

Figure 2:
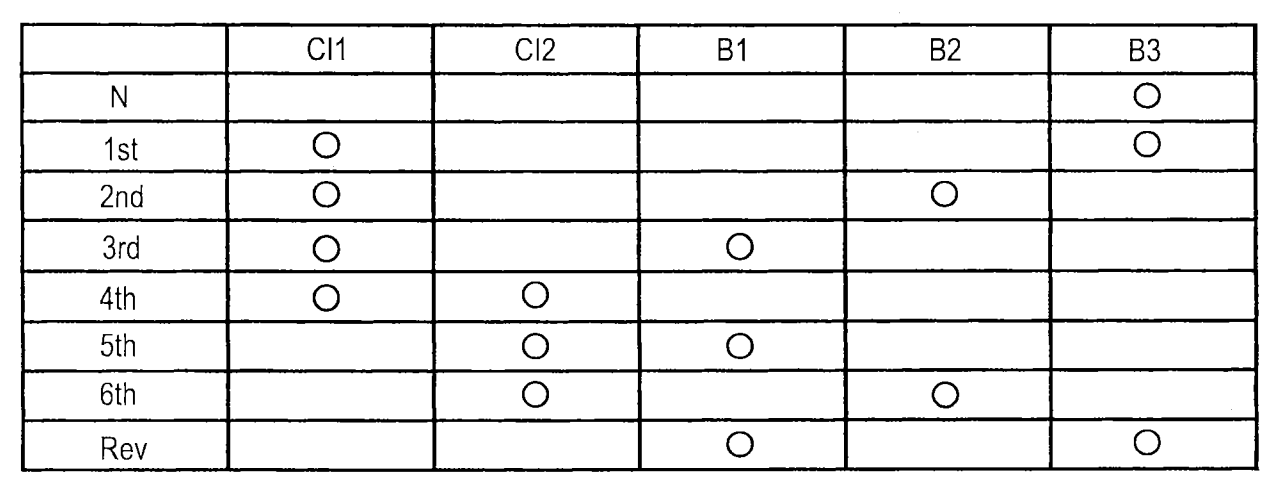

The automatic transmission 4 with such a configuration can form six forward gear stages and one reverse gear stage by selectively engaging or disengaging the clutches Cl1 and Cl2, selectively operating the brakes B1 to B3, and limiting the rotation of the rotating elements of the planetary gear mechanisms P1 to P3. In FIG. 2, when a white circle is drawn in each column for the clutches and the brakes, which corresponds to each gear stage, the engagement element is in an operation state (in an ON state). The operation state of the clutches Cl1 and Cl2 implies that the clutches Cl1 and Cl2 are in a connection state (engagement state), and the operation state of the brakes B1 to B3 implies that the brakes B1 to B3 are in a rotation limiting state (engagement state).

Typically, in a single pinion gear type of planetary gear mechanism, Expression (1) represents a relationship between a rotation speed Ns of the sun gear, a rotation speed Nc of the carrier, and a rotation speed Nr of the ring gear, and a gear ratio λ of the planetary gear mechanism, and a gear ratio for each gear stage is calculated according to Expression (1). When Zs1 to Zs3 refer to the number of teeth of the sun gears S1 to S3, respectively, and Zr1 to Zr3 refer to the number of teeth of the ring gears R1 to R3, respectively, in the planetary gear mechanisms P1 to P3, the gear ratio λ1 of the planetary gear mechanism P1 is equal to Zs1/Zr1, the gear ratio λ2 of the planetary gear mechanism P2 is equal to Zs2/Zr2, and the gear ratio λ3 of the planetary gear mechanism P3 is equal to Zs3/Zr3.

$$Nr=(1+\lambda)Nc-\lambda Ns \quad (1)$$

Figure 3:
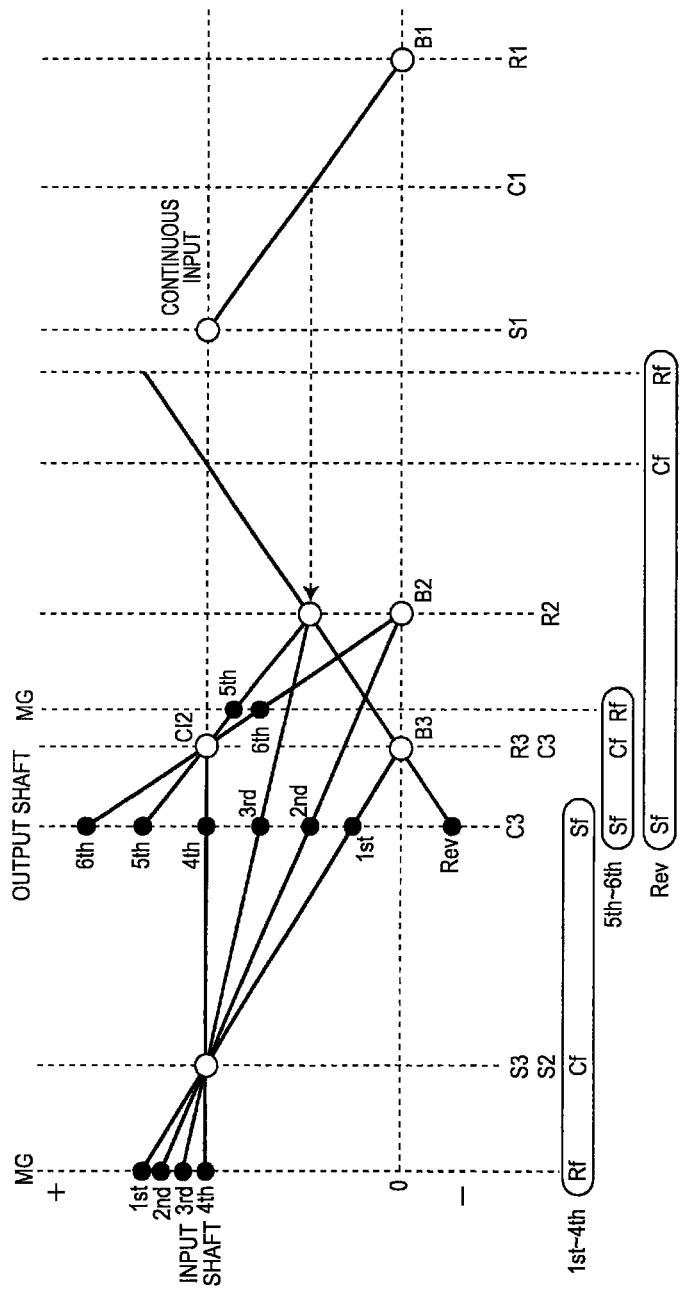
FIG. 3 is a speed diagram illustrating the automatic transmission of the first embodiment.

When the clutches Cl1 and Cl2 are selectively connected, and the brakes B1 to B3 are selectively operated, the respective gear ratios of each of the rotating elements of the planetary gear mechanisms P1 to P3 are as illustrated in a speed diagram in FIG. 3. In this speed diagram, the rotating elements such as the sun gears, the carriers, and the ring gears of the planetary gear mechanisms are disposed with a gap corresponding to a gear ratio interposed therebetween in a horizontal axis direction, and the speed ratios corresponding to the rotating elements, respectively, are taken in a vertical axis direction.

Since the second sun gear S2 and the third sun gear S3 are connected to each other via the third connecting member T3, the speed ratio of the second sun gear S2 and the third sun gear S3 connected to each other is expressed on a vertical axis assigned to S2 and S3. Since the second carrier C2 and the third ring gear R3 are connected to each other via the second connecting member T2, the speed ratio of the second carrier C2 and the third ring gear R3 connected to each other is expressed on a vertical axis assigned to C2 and R3.

Since the first planetary gear mechanism P1 is a single pinion planetary gear mechanism, when a gap between the vertical line of the first sun gear S1 and the vertical line of the first carrier C1 is equal to 1, the vertical line of the first ring gear R1 is disposed on an opposite side to the vertical line of the first sun gear S1 while being distant from the vertical line of the first carrier C1 by a gap λ1. Since the second planetary gear mechanism P2 is a single pinion gear planetary gear mechanism, when a gap between the vertical line of the second sun gear S2 and the vertical line of the second carrier C2 is equal to 1, the vertical line of the second ring gear R2 is disposed on an opposite side to the vertical line of the second sun gear S2 while being distant from the vertical line of the second carrier C2 by a gap λ2. Since the third planetary gear mechanism P3 is a single pinion gear planetary gear mechanism, when a gap between the vertical line of the third sun gear S3 and the vertical line of the third carrier C3 is equal to 1, the vertical line of the third ring gear R3 is disposed on an opposite side to the vertical line of the third sun gear S3 while being distant from the vertical line of the third carrier C3 by a gap λ3.

For example, according to the engagement state table, in a first speed stage of the automatic transmission 4, the first clutch Cl1 and the third brake B3 are in an operation state (engagement state). In this state, the rotation of the input shaft 41 is input to the third sun gear S3 due to the operation of the first clutch Cl1. The third ring gear R3 is locked to the housing 45 due to the operation of the third brake B3, the third ring gear R3 which is locked supports the reaction force of rotational torque input to the third sun gear S3, and rotation input to the input shaft 41 is reduced at a speed reduction ratio corresponding to the number of teeth of the third planetary gear mechanism P3, and is output to the output shaft 42 from the third carrier C3.

When the transition of the speed of the automatic transmission 4 is made from the first speed stage to a second speed stage, an engagement element in operation is switched from the third brake B3 to the second brake B2 while the operation state of the first clutch Cl1 is maintained. In this state, the second brake B2 supports the reaction force of rotational torque input to the second sun gear S2, and rotation input to the input shaft 41 is reduced at a speed reduction ratio corresponding to the number of teeth of the second planetary gear mechanism P2, and is output to the third ring gear R3 from the second carrier C2. Rotation input to the input shaft 41 is input to the third sun gear S3, is reduced to at a speed reduction ratio corresponding to the number of teeth of the third planetary gear mechanism P3, and is output to the output shaft 42 from the third carrier C3.

As such, as illustrated in the speed diagram in FIG. 3, the automatic transmission 4 can form gear stages which become different gear ratios, by selectively operating two engagement elements of the five engagement elements. As illustrated in the engagement status table in FIG. 2, in the automatic transmission 4, the transition of the gear stage to an adjacent gear stage can be made by switching the state of one of two engagement elements in operation.

Shift Map

Figure 4:
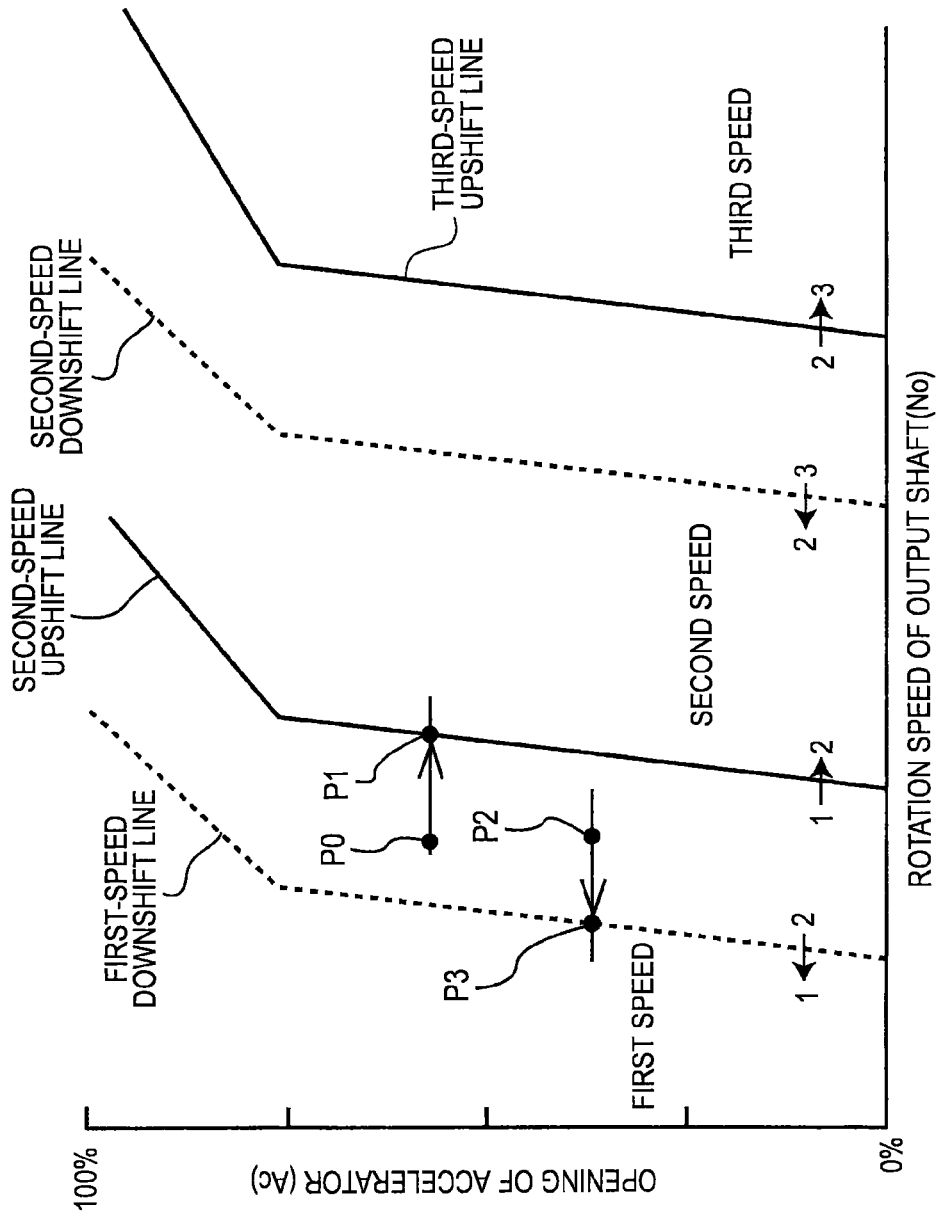
FIG. 4 is a graph illustrating shift lines of the automatic transmission, the horizontal axis indicates an output shaft rotation speed, and the vertical axis indicates an accelerator pedal opening.

As illustrated in FIG. 4, a "shift map" has a plurality of "shift lines", each of which represents a relationship between the accelerator pedal opening Ac and the output shaft rotation speed No. A second speed upshift line and a third speed upshift line (illustrated by solid lines in FIG. 4) are sequentially set in a speed-increasing direction (direction in which the output shaft rotation speed No increases from a low speed to a high speed). A second speed downshift line and a first speed downshift line (illustrated by dotted lines in FIG. 4) are sequentially set in a speed-decreasing direction (direction in which the output shaft rotation speed No increases from a high speed to a low speed). Similarly, the "shift line" is also set in the gear stages thereabove.

In FIG. 4, when the output shaft rotation speed No increases gradually in a state where the vehicle is travelling with the gear stage of the automatic transmission 4 set to the first speed stage (state of P0), and the vehicle reaches a point P1 on the second speed upshift line, the control unit 10 changes a "recognized gear stage" from the first speed stage to the second speed stage. In contrast, when the output shaft rotation speed No decreases gradually in a state where the vehicle is travelling with the gear stage of the automatic transmission 4 set to the second speed stage (state of P2), and the vehicle reaches a point P3 on the first speed downshift line, the control unit 10 changes a "recognized gear stage" from the second speed stage to the first speed stage. The control unit 10 controls the engagement elements in such a manner that the gear stage of the automatic transmission 4 becomes the "recognized gear stage".

Description of Electric Travelling Mode and Spilt Travelling Mode

Subsequently, an "electric travelling mode" and a "split travelling mode" will be described. The vehicle is travelling in the "electric travelling mode" or the "split travelling mode", and the vehicle can switch a travelling mode between both travelling modes while travelling. The "electric travelling mode" is a mode in which the vehicle is traveling on only the torque (hereinafter, simply referred to as motor torque Tm) of the motor generator1. The "split travelling mode" is a mode in which the vehicle is traveling with the motor torque Tm and the torque of the engine 2 (hereinafter, simply referred to as engine torque Te).

When the "demand torque" can be obtained from only the motor torque Tm in a state where the residual capacity of the battery 16 is sufficient, the vehicle is travelling in the "electric travelling mode". In the "electric travelling mode", the automatic transmission 4 forms a gear stage based on the "shift map" illustrated in FIG. 4. In the "electric travelling mode", the control unit 10 controls the clutch actuator 33 to disengage the clutch 3. In this state, the drive shaft 21 of the engine 2 is disengaged from the input shaft 41. The control unit 10 outputs a control signal to the inverter device 15, and drives the motor generator 1 in order for the motor torque to become the "demand motor torque". Since the drive shaft 21 of the engine 2 is disengaged from the input shaft 41, the engine 2 does not rotate, and the rotation speed of the engine 2 (hereinafter, simply referred to as engine rotation speed Ne) becomes 0. For this reason, engine friction torque does not occur, and thereby this results in an improvement in the electrical power consumption of the vehicle 1000.

When the "demand drive torque" cannot be obtained from only the motor torque Tm while the vehicle is travelling in the "electric travelling mode", the control unit 10 controls the clutch actuator 33 to engage the clutch 3, and thereby the drive shaft 21 of the engine 2 is engaged with the input shaft 41. The control unit 10 outputs a control signal to the inverter device 15, and drives the motor generator 1 in order for the motor torque Tm to become a "target motor torque". The control unit 10 controls the engine 2 in order for the engine torque Te to become a "target engine torque".

The engine torque Te and the motor torque Tm are output to the output shaft 42 while being reduced or increased by the automatic transmission 4, and thereby the vehicle 1000 is travelling with the engine torque Te and the motor torque Tm.

While the vehicle is travelling, when the control unit 10 determines that the accelerator pedal 91 is let off (the accelerator pedal opening Ac is 0), or that the brake pedal 93 is depressed (brake operation amount Bk is greater than 0), the control unit 10 executes a "regenerative braking" operation. In the "regenerative braking" operation, in principle, the control unit 10 controls the clutch actuator 33 to disengage the clutch 3, and thereby the drive shaft 21 of the engine 2 is disengaged from the input shaft 41. Subsequently, the control unit 10 controls the inverter device 15 in such a manner that the motor generator 1 generates a regenerative braking force, and electrical power. As such, since the "regenerative braking" operation is executed in a state where the drive shaft 21 of the engine 2 is disengaged from the input shaft 41, the kinetic energy of the vehicle 1000 is not wasted by the friction torque of the engine 2. When the residual capacity of the battery 16 is greater than or equal to a specified value, or when more braking force is generated, the control unit 10 controls the clutch actuator 33 to engage the clutch 3, thereby the engine 2 rotates, and the friction torque of the engine 2 (so-called engine braking) is used to reduce the speed of the vehicle.

Travelling Control Process

Figure 5:
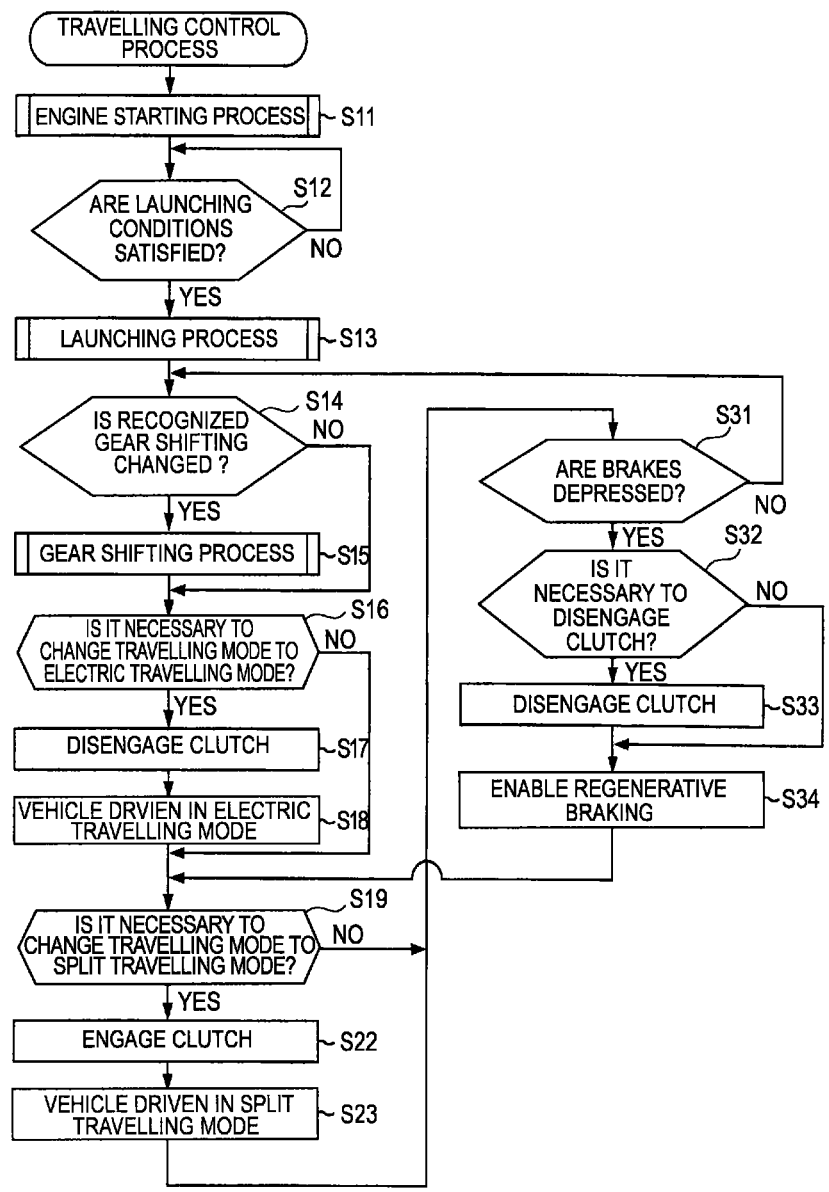
FIG. 5 is a flowchart illustrating a "travelling control process"
Figure 8:
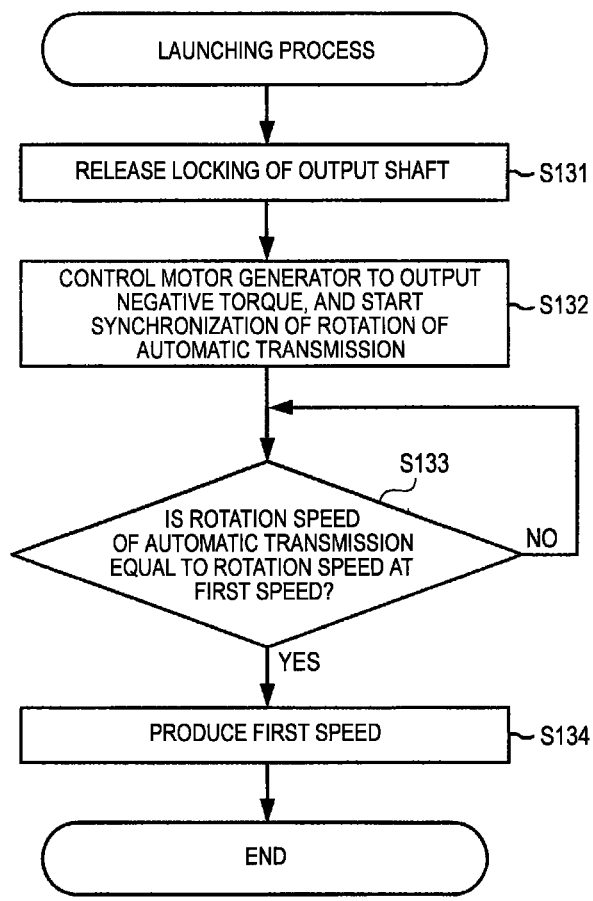
FIG. 8 is a flowchart illustrating a "launch process" which is a sub-routine of the "travelling control process"
Figure 12:
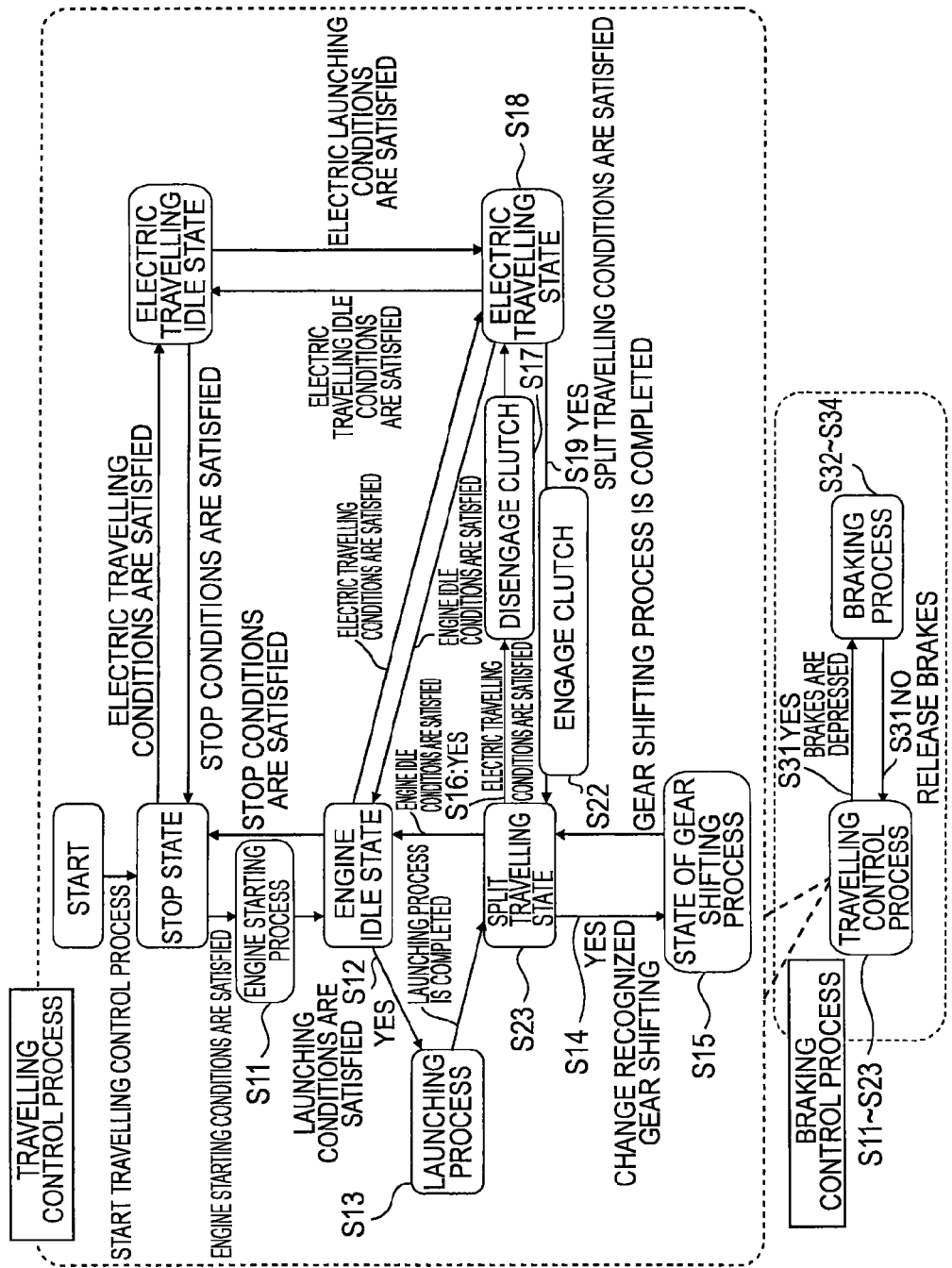
FIG. 12 is a diagram illustrating the transition of a travelling state of the hybrid vehicle.

Subsequently, a "travelling control process" will be described with reference to the flowcharts illustrated in FIGS. 5, 6, and 8, and a transition diagram illustrated in FIG. 12 which illustrates a travelling state of the hybrid vehicle 1000. When ignition is turned on, the "travelling control process" starts, and the program proceeds to step S11. In step S11, an "engine start-up process" starts. When the "engine start-up process" starts, the program proceeds to step S111 in FIG. 6.

In step S111, when the control unit 10 determines that the output shaft 42 is locked to the housing 45 (S111: YES), the program proceeds to step S113, and when the control unit 10 determines that the output shaft 42 is not locked to the housing 45 (S111: NO), the program proceeds to step S112.

In step S112, the control unit 10 locks the output shaft 42 to the housing 45 using the parking brake PB, and thereby the output shaft 42 is brought into a non-rotatable state. In this state, any one of the first to sixth speed stages is not formed in the automatic transmission 4, and the automatic transmission 4 is brought into a neutral state. When step S112 ends, the program proceeds to step S113.

In step S113, when the control unit 10 determines that the clutch 3 is engaged (S113: YES), the program proceeds to step S115, and when the control unit 10 determines that the clutch 3 is not engaged (S113: NO), the program proceeds to step S114.

In step S114, the control unit 10 outputs a control signal to the clutch actuator 33, thereby the clutch actuator 33 engages the clutch 3, and the program proceeds to step S115.

Figure 7:
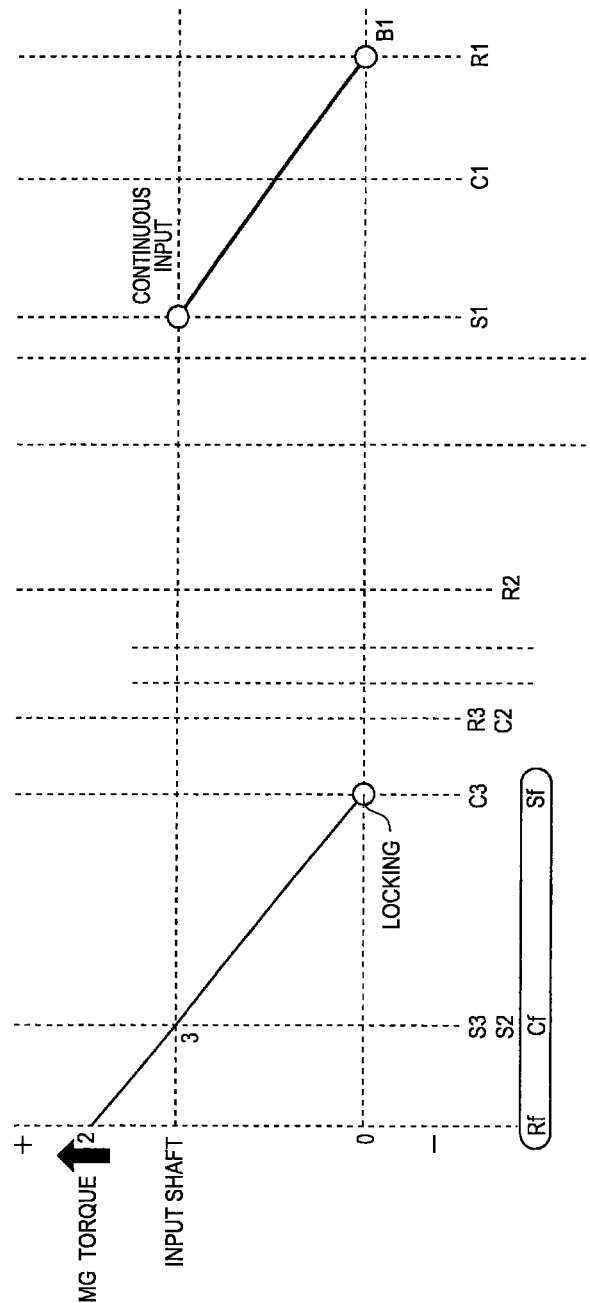
FIG. 7 is a speed diagram illustrating engine start-up of the hybrid vehicle.

In step S115, the control unit 10 controls the inverter device 15, and thereby the rotation of the motor generator 1 starts so as to make the engine rotation speed Ne become a rotation speed at engine start-up. Since the output shaft 42 is locked to the housing 45 by the parking brake PB, the sun gear Sf does not rotate (1 in FIG. 7). When the motor generator 1 rotates, the ring gear Rf rotates (2 in FIG. 7), the carrier Cf rotates (3 in FIG. 7), and the engine 2 rotatably connected to the carrier Cf rotates. When step S115 ends, the program proceeds to step S116.

In step S116, the control unit 10 opens the throttle valve 22, and controls the fuel injection device 28 to inject fuel, and thereby the start-up of the engine 2 starts. When the engine 2 is a gasoline engine, the control unit 10 controls the ignition device to start ignition. When step S116 ends, the program proceeds to step S117.

In step S117, when the control unit 10 determines that the engine 2 is started up (S117: YES), the program proceeds to step S118, and when the control unit 10 determines that the engine 2 is not started up (S117: NO), the process in step S117 is repeated.

In step S118, the control unit 10 ends the control of the motor generator 1 for starting up the engine via the inverter device 15. When step S118 ends, the "engine start-up process" ends, and the program proceeds to step S12 in FIG. 5.

In step S12, the control unit 10 determines that launch conditions are satisfied (S12: YES), the program proceeds to step S13, and when the control unit 10 determines that the launch conditions are not satisfied (S12: NO), the process in step S12 is repeated. When the brake pedal 93 is let off, or when the accelerator pedal 91 is depressed, the control unit 10 determines that the launch conditions are satisfied.

In step S13, the control unit 10 starts a "launch process". When the "launch process" starts, the program proceeds to step S131 in FIG. 8.

In step S131, the control unit 10 allows the output shaft 42 to rotate with respect to the housing 45 by releasing the parking brake PB (1 in FIG. 9), and the program proceeds to step S132.

Figure 9:
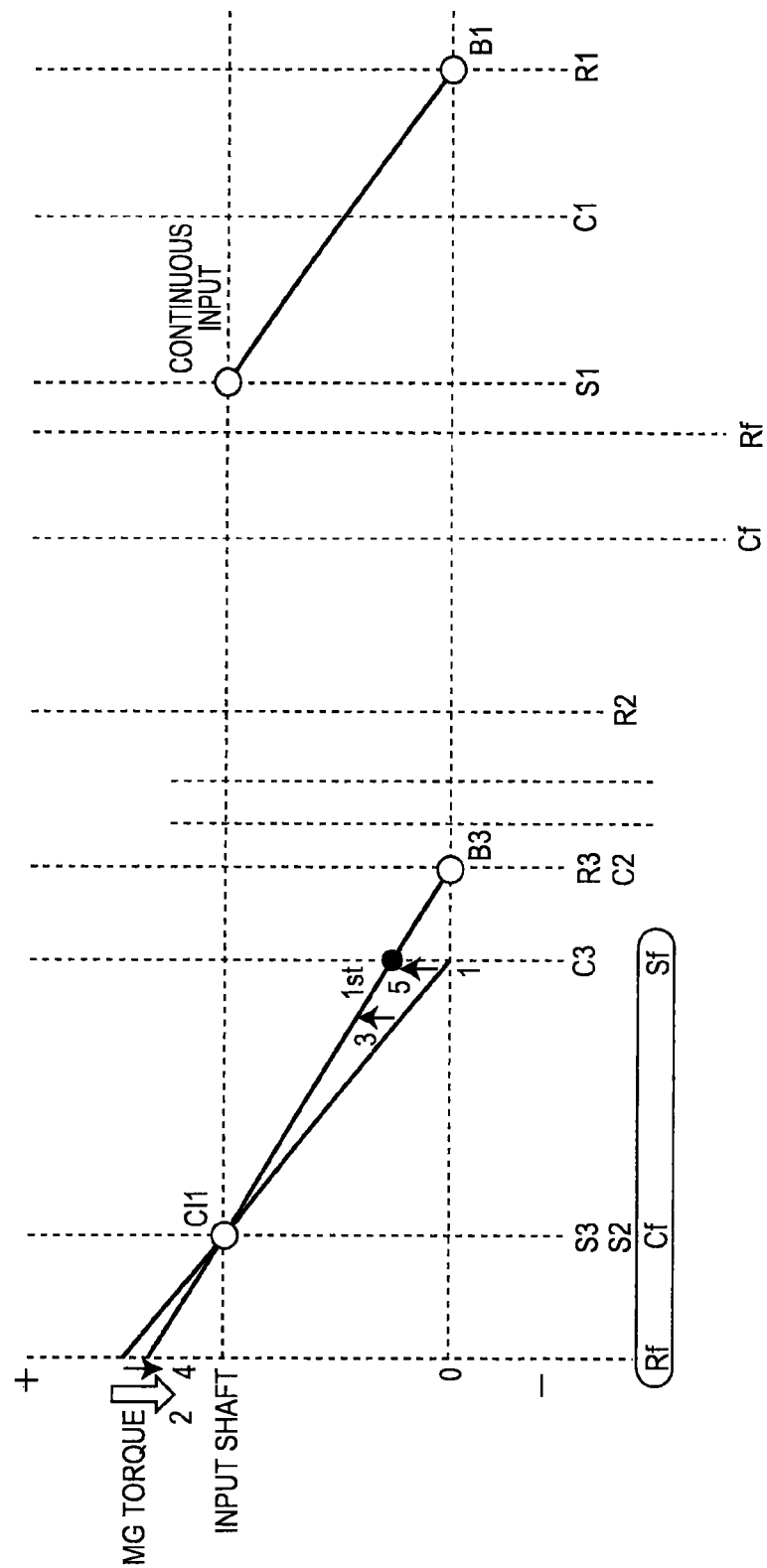
FIG. 9 is a speed diagram illustrating the launch of the hybrid vehicle.

In step S132, the control unit 10 starts controlling the inverter device 15 based on detection signals from the input shaft rotation speed sensor 41-1, the output shaft rotation speed sensor 42-1, and the motor generator rotation speed sensor 13, thereby the motor generator 1 generates electrical power, and the motor generator 1 outputs negative torque (2 in FIG. 9), and the respective rotation speeds of the third sun gear S3, the third carrier C3, and the third ring gear R3 of the automatic transmission 4 become a rotation speed for the first speed stage in a speed diagram illustrated in FIG. 9 (3 in FIG.

9). That is, when the motor generator 1 outputs negative torque (2 in FIG. 9), the rotation speed of the motor generator 1 decreases, and the rotation speed of the ring gear Rf decreases (4 in FIG. 9). Since the output shaft 42 is rotatable, as the rotation speed of the ring gear Rf decreases, the rotation speed of the sun gear Sf increases (5 in FIG. 9), and the output shaft rotation speed No increases. The vehicle 1000 launches as the output shaft rotation speed No increases. The engine rotation speed Ne is controlled to be a rotation speed based on an idling rotation speed or an accelerator pedal opening Ac. When step S132 ends, the program proceeds to step S133.

In step S133, when the control unit 10 determines that the respective rotation speeds of the third sun gear S3, the third carrier C3, and the third ring gear R3 of the automatic transmission 4 become the rotation speed for the first speed stage in the speed diagram illustrated in FIG. 9, based on the detection signals from the input shaft rotation speed sensor 41-1 and the output shaft rotation speed sensor 42-1 (S133: YES), the program proceeds to step S134. When the control unit 10 determines that the respective rotation speeds of the third sun gear S3, the third carrier C3, and the third ring gear R3 of the automatic transmission 4 do not become the rotation speed for the first speed stage in the speed diagram illustrated in FIG. 9 (S133: NO), the process in step S133 is repeated.

In step S134, the control unit 10 engages the first clutch Cl1 and the third brake B3, and the automatic transmission 4 forms the first speed stage. When step S134 ends, the "launch process" ends, the program proceeds to step S14 in FIG. 5.

In step S14, the control unit 10 determines that the "recognized gear stage" is changed (S14: YES), the program proceeds to step S15, and when the control unit 10 determines that the "recognized gear stage" is not changed (S14: NO), the program proceeds to step S16.

In step S15, the control unit 10 starts a "gear shifting process". When the "gear shifting process" starts, the program proceeds to step S151 in FIG. 10.

In step S151, when the control unit 10 determines that the "recognized gear stage" is an upshift gear stage (S151: YES), the program proceeds to step S152, and when the control unit 10 determines that the "recognized gear stage" is a downshift gear stage (S151: NO), the program proceeds to step S155.

In step S152, the control unit 10 releases the next gear stage, that is, engagement elements which are not engaged in the "recognized gear stage". For example, when the transmission is shifted from the first speed stage to the second speed stage, the control unit 10 releases the third brake B3 which is not engaged in the second speed stage. When step S152 ends, the program proceeds to step S153.

Figure 11:
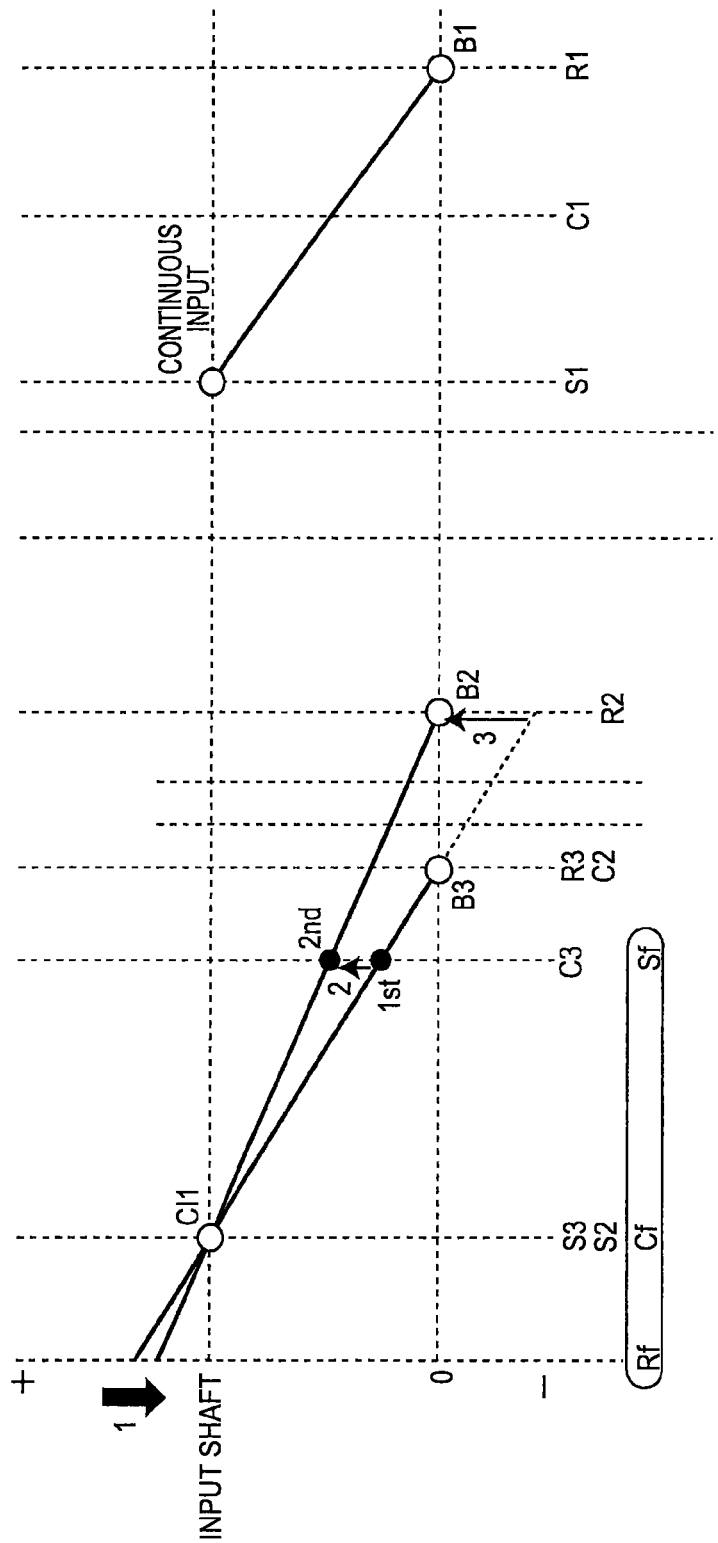
FIG. 11 is a speed diagram illustrating when the automatic transmission is shifted from a first speed stage to a second speed stage.

In step S153, the control unit 10 starts controlling the inverter device 15 based on detection signals from the input shaft rotation speed sensor 41-1, the output shaft rotation speed sensor 42-1, and the motor generator rotation speed sensor 13, thereby the motor generator 1 generates electrical power, and the motor generator 1 outputs negative torque, and the respective rotation speeds of the rotating elements of the automatic transmission 4 become a rotation speed for the next gear stage, that is, a rotation speed for the "recognized gear stage". As illustrated in FIG. 11, when the first speed stage is formed in the automatic transmission 4, the control unit 10 starts controlling the negative torque of the motor generator 1 to be input to the ring gear Rf (1 in FIG. 11) in such a manner that the rotation speed of the third carrier C3 becomes a rotation speed for the second speed stage which is the next gear stage (2 in FIG. 11), and the rotation speed of the second ring gear R2 becomes the rotation speed (stop) for the second speed stage. The input shaft rotation speed Ni and the rotation speed of the engine 2 decrease due to the negative torque output from the motor generator 1, rotation energy (positive inertia torque) stored in the crankshaft or the flywheel of the engine 2 is input to the planetary gear mechanism 5, and thereby the speed of the vehicle 1000 is prevented from being reduced. When step S153 ends, the program proceeds to step S157.

In step S155, the control unit 10 releases the next gear stage, that is, engagement elements which are not engaged in the "recognized gear stage". When step S155 ends, the program proceeds to step S156.

In step S156, the control unit 10 starts controlling the inverter device 15 based on detection signals from the input shaft rotation speed sensor 41-1, the output shaft rotation speed sensor 42-1, and the motor generator rotation speed sensor 13, thereby the motor generator 1 is driven to output positive torque, and the respective rotation speeds of the rotating elements of the automatic transmission 4 become a rotation speed for the next gear stage, that is, the "recognized gear stage". When step S156 ends, the program proceeds to step S157.

In step S157, when the control unit 10 determines that the respective rotation speeds of the rotating elements of the automatic transmission 4 is changed to the rotation speed for the next gear stage ("recognized gear stage") based on the detection signals from the input shaft rotation speed sensor 41-1 and the output shaft rotation speed sensor 42-1 (S157: YES), the program proceeds to step S158. When the control unit 10 determines that the respective rotation speeds of the rotating elements of the automatic transmission 4 is not changed to the rotation speed for the next gear stage (S157: NO), the process in step S157 is repeated.

In step S158, the control unit 10 engages the engagement elements corresponding to the "recognized gear stage", and thereby the "recognized gear stage" is formed. When step S158 ends, the "gear shifting process" ends, and the program proceeds to step S16 of FIG. 5.

In step S16, when the control unit 10 determines that it is necessary to set a travelling mode to the "electric travelling mode" (S16: YES), the program proceeds to step S17, and when the control unit 10 determines that it is not necessary to set a travelling mode to the "electric travelling mode" (S16: NO), the program proceeds to step S19. When the residual capacity of the battery 16 is greater than or equal to a default value, and the "demand drive torque" can be obtained from only the motor torque Tm, the control unit 10 determines that it is necessary to set a travelling mode to the "electric travelling mode".

In step S17, the control unit 10 decreases the output of the engine 2, controls the clutch actuator 33 to disengage the clutch 3, and disconnects the engine 2 from the input shaft 41. When step S17 ends, the program proceeds to step S18.

In step S18, the control unit 10 controls the inverter device 15 in such a manner that the motor torque Tm output from the motor generator 1 becomes the "target motor torque". When step S18 ends, the program proceeds to step S19.

In step S19, the control unit 10 determines that it is necessary to set a travelling mode to the "split travelling mode" (S19: YES), the program proceeds to step S22, and when the control unit 10 determines that it is not necessary to set a travelling mode to the "split travelling mode" (S19: NO), the program proceeds to step S31. When the residual capacity of the battery 16 is less than a default value, or when the "demand drive torque" cannot be obtained from only the motor torque Tm, the control unit 10 determines that it is necessary to set a travelling mode to the "split travelling mode".

In step S22, the control unit 10 rotatably connects the engine 2 and the input shaft 41 by controlling the clutch actuator 33 to engage the clutch 3. When step S22 ends, the program proceeds to step S23.

In step S23, the control unit 10 controls the engine 2 and the inverter device 15 to drive the vehicle 1000 with the engine torque Te and the motor torque Tm, or to drive the motor generator 1 to generate electrical power while driving the vehicle 1000 with the engine torque Te. When step S23 ends, the program proceeds to step S31.

In step S31, when the control unit 10 determines that the brake pedal 93 is depressed, based on a detection signal from the brake pedal sensor 94 (S31: YES), the program proceeds to step S32, and when the control unit 10 determines that the brake pedal 93 is not depressed (S31: NO), the program proceeds to step S14.

In step S32, the control unit 10 determines that it is necessary to disengage the clutch 3 (S32: YES), the program proceeds to step S33, and when the control unit 10 determines that it is not necessary to disengage the clutch 3 (S33: NO), the program proceeds to step S34. When the residual capacity of the battery 16 is greater than or equal to a specified value, or when more braking force is generated, in a case where the clutch 3 is already disengaged, the control unit 10 determines that it is not necessary to disengage the clutch 3, and in other cases, the control unit 10 determines that it is necessary to disengage the clutch 3.

In step S33, the control unit 10 decreases the output of the engine 2, controls the clutch actuator 33 to disengage the clutch 3, and disconnects the engine 2 from the input shaft 41. When step S33 ends, the program proceeds to step S34.

In step S34, the control unit 10 controls the inverter device 15 in such a manner that the motor generator 1 generates electrical power, and a regenerative braking force. When a "demand braking force" cannot be obtained from only the regenerative braking force, the control unit 10 controls the friction brake device to generate a friction braking force. When step S34 ends, the program returns to step S19.

When the vehicle 1000 moves reversely, the control unit 10 drives at least one of the motor generator 1 and the engine 2 by engaging the first brake B1 and the third brake B3. Alternatively, when a forward gear stage is formed in the automatic transmission 4, and the clutch 3 is disengaged, the control unit 10 controls the inverter device 15 to reversely rotate the motor generator 1, and thereby the vehicle 1000 moves reversely.

Drive Apparatus for Hybrid Vehicle of Second Embodiment

Figure 13:
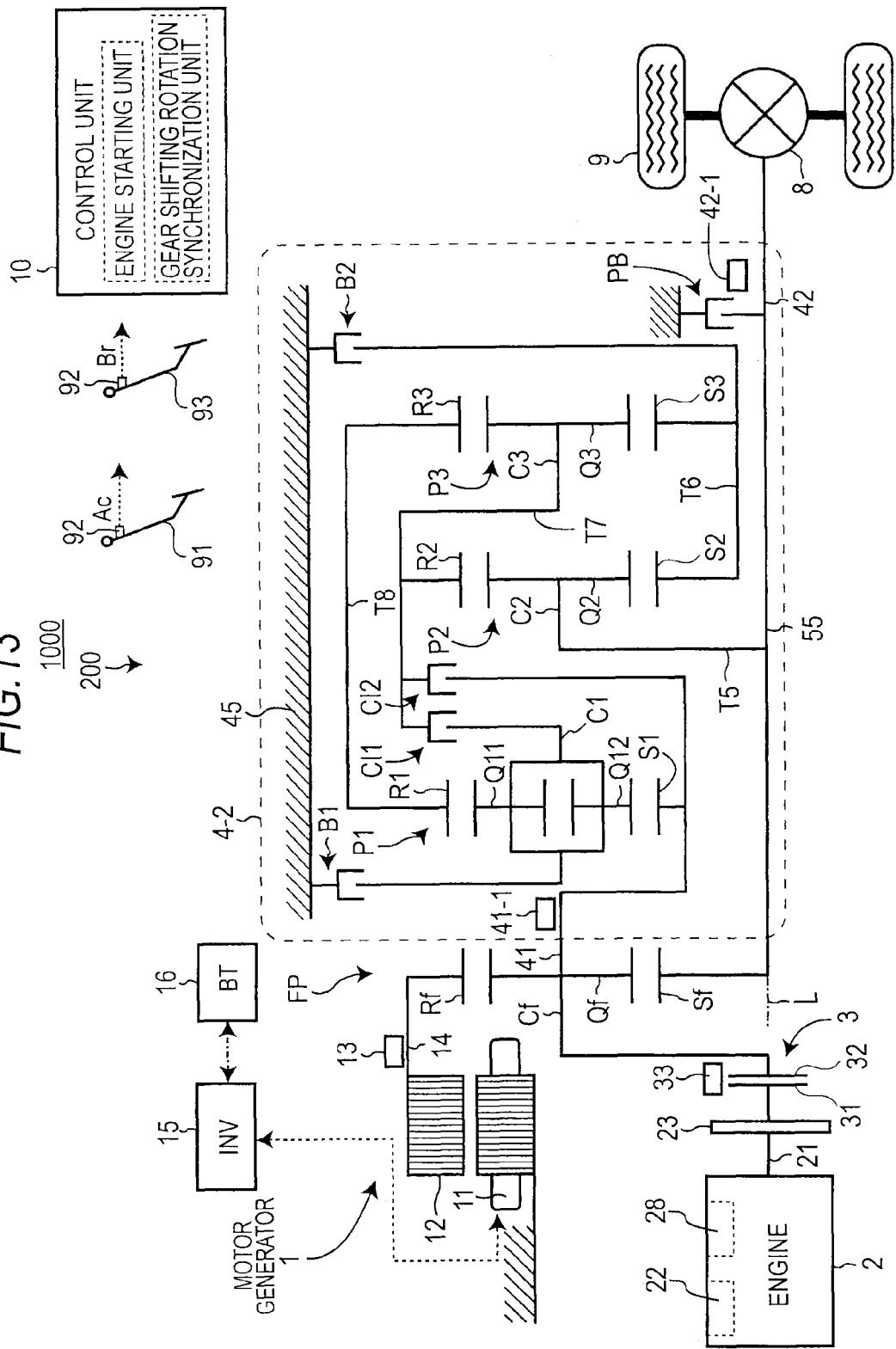
FIG. 13 is a diagram illustrating a hybrid vehicle equipped with a drive apparatus for a hybrid vehicle of a second embodiment.

Hereinafter, the points of difference of a drive apparatus 200 for a hybrid vehicle (hereinafter, as necessary, simply referred to as a drive apparatus 200) of a second embodiment from the drive apparatus 100 of the first embodiment will be described with reference to FIG. 13. An automatic transmission 4-2 of the drive apparatus 200 for a hybrid vehicle of the second embodiment has the input shaft 41; the output shaft 42; the planetary gear mechanisms P1 to P3; the clutches Cl1 and Cl2; the brakes B1 and B2; the input shaft rotation speed sensor 41-1; the output shaft rotation speed sensor 42-1; and the parking brake PB.

The first planetary gear mechanism P1 is a dual pinion planetary gear mechanism that includes the first sun gear S1 that is supported so as to be rotatable coaxially about the rotational axis line L; the first ring gear R1; a first pinion gear Q11 that meshes with the first ring gear R1; a first intermediate gear Q12 that meshes with the first pinion gear Q11 and the first sun gear S1; and the first carrier C1 that supports the first pinion gear Q11 and the first intermediate gear Q12. The structure of each of the second planetary gear mechanism P2 and the third planetary gear mechanism P3 is the same as that of the second planetary gear mechanism P2 and the third planetary gear mechanism P3 of the drive apparatus 100 for a hybrid vehicle of the first embodiment.

The second carrier C2 is connected to the connecting member 55 via a fifth connecting member T5. The second sun gear S2 and the third sun gear S3 are connected to each other via a sixth connecting member T6. The second ring gear R2 and the third carrier C3 are connected to each other via a seventh connecting member T7. The first ring gear R1 and the third ring gear R3 are connected to each other via an eighth connecting member T8.

The first brake B1 brakes the rotation of the first carrier C1. The second brake B2 brakes the rotation of the second sun gear S2 and the third sun gear S3.

The first clutch Cl1 engageably and disengageably connects the first carrier C1, the second ring gear R2 and the third carrier C3. The second clutch Cl2 engageably and disengageably connects the input shaft 41, the first sun gear S1, the second ring gear R2, and the third carrier C3.

Operation of Automatic Transmission of Second Embodiment

Figure 14:
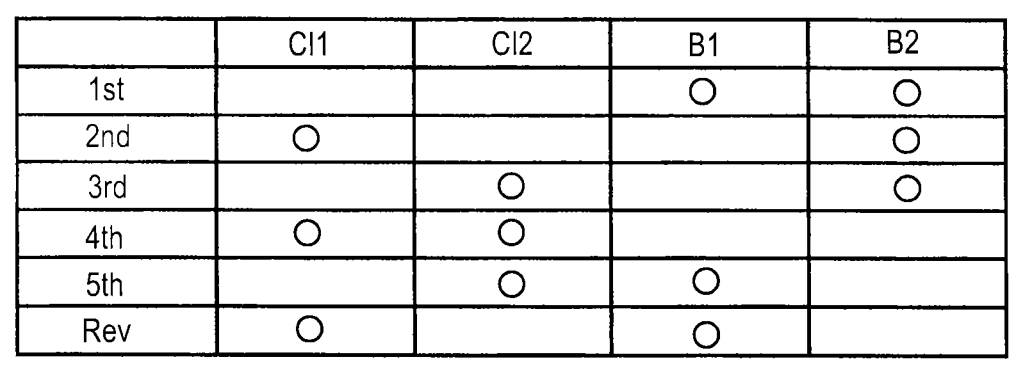

The automatic transmission 4-2 with such a configuration can form five forward gear stages and one reverse gear stage by selectively engaging or disengaging the clutches Cl1 and Cl2, selectively operating the brakes B1 and B2, and limiting the rotation of the rotating elements of the planetary gear mechanisms P1 to P3. In FIG. 14, when a white circle is drawn in each column for the clutches and the brakes, which corresponds to each gear stage, the engagement element is in an operation state (in an ON state). The operation state of the clutches Cl1 and Cl2 implies that the clutches Cl1 and Cl2 are in a connection state (engagement state), and the operation state of the brakes B1 and B2 implies that the brakes B1 and B2 are in a rotation limiting state (engagement state). Since the structure and operation of the automatic transmission 4-2 is disclosed in JP2000-337458A, description thereof will be omitted.

Drive Apparatus for Hybrid Vehicle of Third Embodiment

Figure 15:
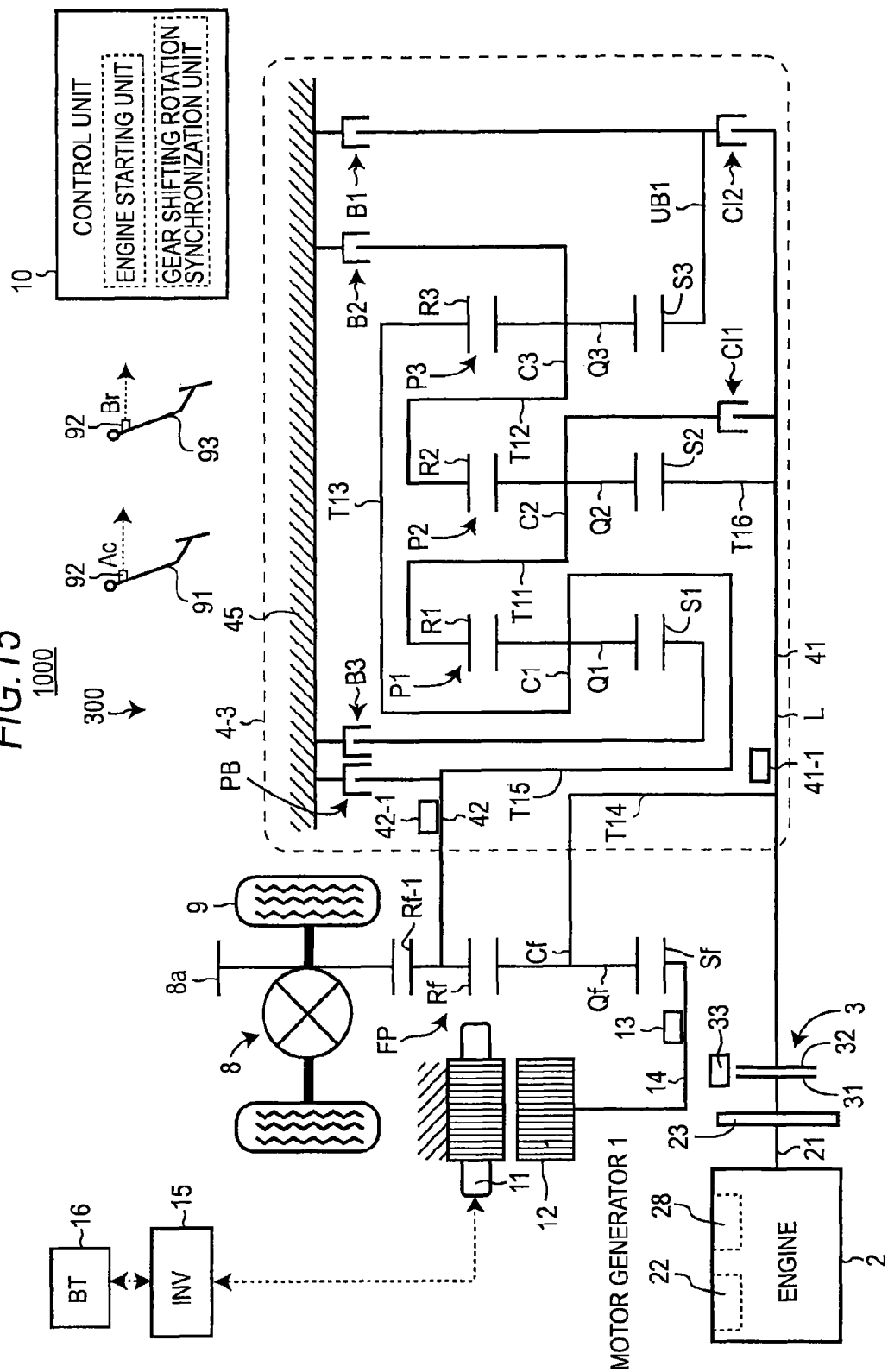
FIG. 15 is a diagram illustrating a hybrid vehicle equipped with a drive apparatus for a hybrid vehicle of a third embodiment.

Hereinafter, the points of difference of a drive apparatus 300 for a hybrid vehicle (hereinafter, as necessary, simply referred to as a drive apparatus 300) of a third embodiment from the drive apparatus 100 of the first embodiment will be described with reference to FIG. 15. An automatic transmission 4-3 of the drive apparatus 300 for a hybrid vehicle of the third embodiment has the input shaft 41; the output shaft 42; the planetary gear mechanisms P1 to P3; the clutches Cl1 and Cl2; the brakes B1 to B3; the input shaft rotation speed sensor 41-1; the output shaft rotation speed sensor 42-1; and the parking brake PB.

The structure of each of the first planetary gear mechanism P1 to the third planetary gear mechanism P3 is the same as that of the first planetary gear mechanism P1 to the third planetary gear mechanism P3 of the drive apparatus 100 for a hybrid vehicle of the first embodiment. The first ring gear R1 and the second carrier C2 are connected to each other via an eleventh connecting member T11. The second ring gear R2 and the third carrier C3 are connected to each other via a twelfth connecting member T12. The first carrier C1 and the third ring gear R3 are connected to each other via a thirteenth connecting member T13. The input shaft 41 and the second sun gear S2 are connected to each other via a sixteenth connecting member 16.

The input shaft 41 is connected to the driven member 32 of the clutch 3. The input shaft 41 is connected to the carrier Cf of the planetary gear mechanism FP via a fourteenth connecting member T14. With this configuration, the drive shaft 21 of the engine 2 is rotatably connected to the carrier Cf. The output shaft 42 and the first carrier C1 are connected to each other via a fifteenth connecting member T15. The output shaft 42 is connected to the ring gear Rf of the planetary gear mechanism FP.

The first brake B1 brakes the third sun gear S3 by braking a first brake connecting member UB1 connected to the third sun gear S3. The second brake B2 brakes the third carrier C3. The third brake B3 brakes the first sun gear S1.

The first clutch Cl1 engageably and disengageably connects the second carrier C2 and the input shaft 41. The second clutch Cl2 engageably and disengageably connects the input shaft 41 and the first brake connecting member UB1.

The rotation shaft 14 of the motor generator 1 is connected to the sun gear Sf of the planetary gear mechanism FP. External teeth Rf-1 is formed on an outer circumference of the ring gear Rf of the planetary gear mechanism FP. The external teeth Rf-1 of the ring gear Rf meshes with a ring gear 8a of the differential 8.

Operation of Automatic Transmission of Third Embodiment

Figure 16:
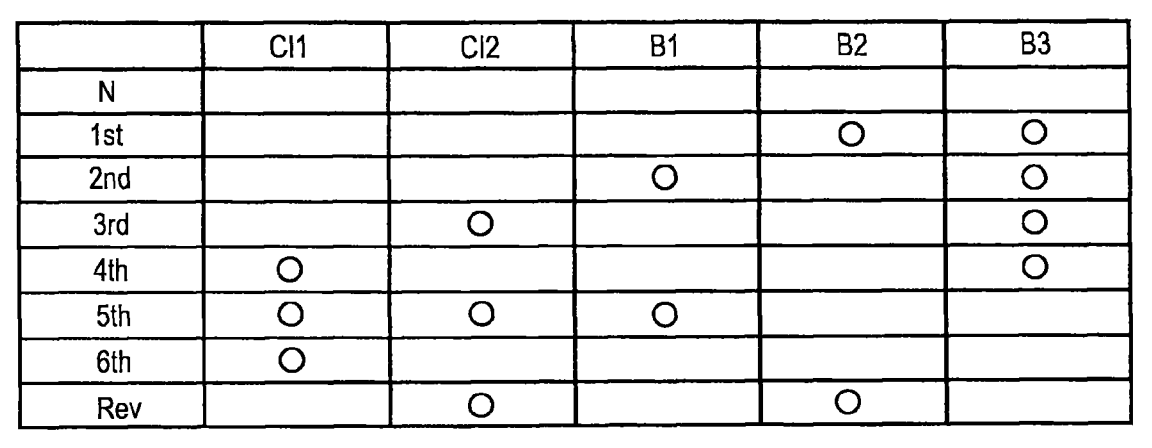

The automatic transmission 4-3 with such a configuration can form six forward gear stages and one reverse gear stage by selectively engaging or disengaging the clutches Cl1 and Cl2, selectively operating the brakes B1 to B3, and limiting the rotation of the rotating elements of the planetary gear mechanisms P1 to P3. In FIG. 16, when a white circle is drawn in each column for the clutches and the brakes, which corresponds to each gear stage, the engagement element is in an operation state (in an ON state). The operation state of the clutches Cl1 and Cl2 implies that the clutches Cl1 and Cl2 are in a connection state (engagement state), and the operation state of the brakes B1 to B3 implies that the brakes B1 to B3 are in a rotation limiting state (engagement state).

Effects of Embodiment

As being apparent from the description above, the drive shaft 21 of the engine 2, the rotation shaft 14 of the motor generator 1, the input shaft 41, and the output shaft 42 are connected to the elements of the planetary gear mechanism FP that is provided between the automatic transmission 4, and the engine 2 and the motor generator 1. Accordingly, the drive force of the motor generator 1 is input to the automatic transmission 4 via the planetary gear mechanism FP. For this reason, the motor generator 1 can provide an assist drive force for all gear stages, and generate electrical power without the motor generator 1 being locked by the gear stages of the automatic transmission 4. The automatic transmission 4 adjusts a drive force output from the motor generator 1 to an appropriate level of torque.

Figure 6:
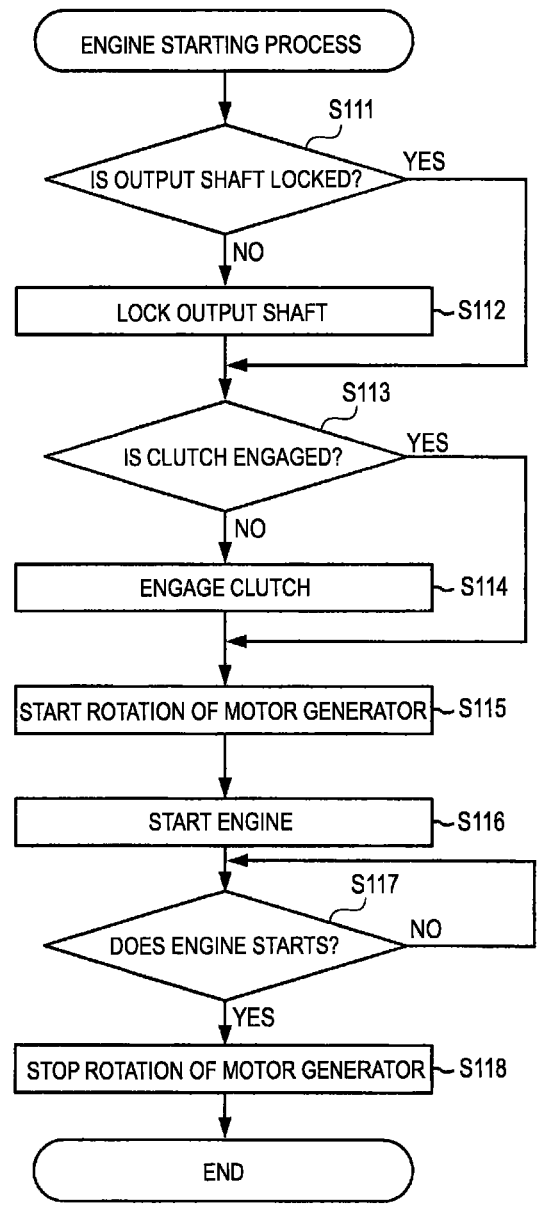
FIG. 6 is a flowchart illustrating an "engine start-up process" which is a sub-routine of the "travelling control process"

The control unit 10 (engine starting unit) starts the engine 2 (S116) by driving the motor generator 1 (S115) in a state where (when) the output shaft 42 is in a non-rotatable state (S111 in FIG. 6: YES, S112) due to the parking brake PB (locking unit). Accordingly, since the parking brake PB supports the motor torque Tm output from the motor generator 1 at start-up of the engine 2, it is possible to start the engine 2 by reliably transmitting the motor torque Tm to the engine 2, and allowing the motor generator 1 to rotate the engine 2. For this reason, a self-starting motor dedicated for starting up the engine 2 is not required. Since the parking brake PB brings the output shaft 42 into a non-rotatable state, the rotation of the output shaft 42 is prevented from causing a reverse movement of the vehicle 1000 at start-up of the engine 2.

Figure 10:
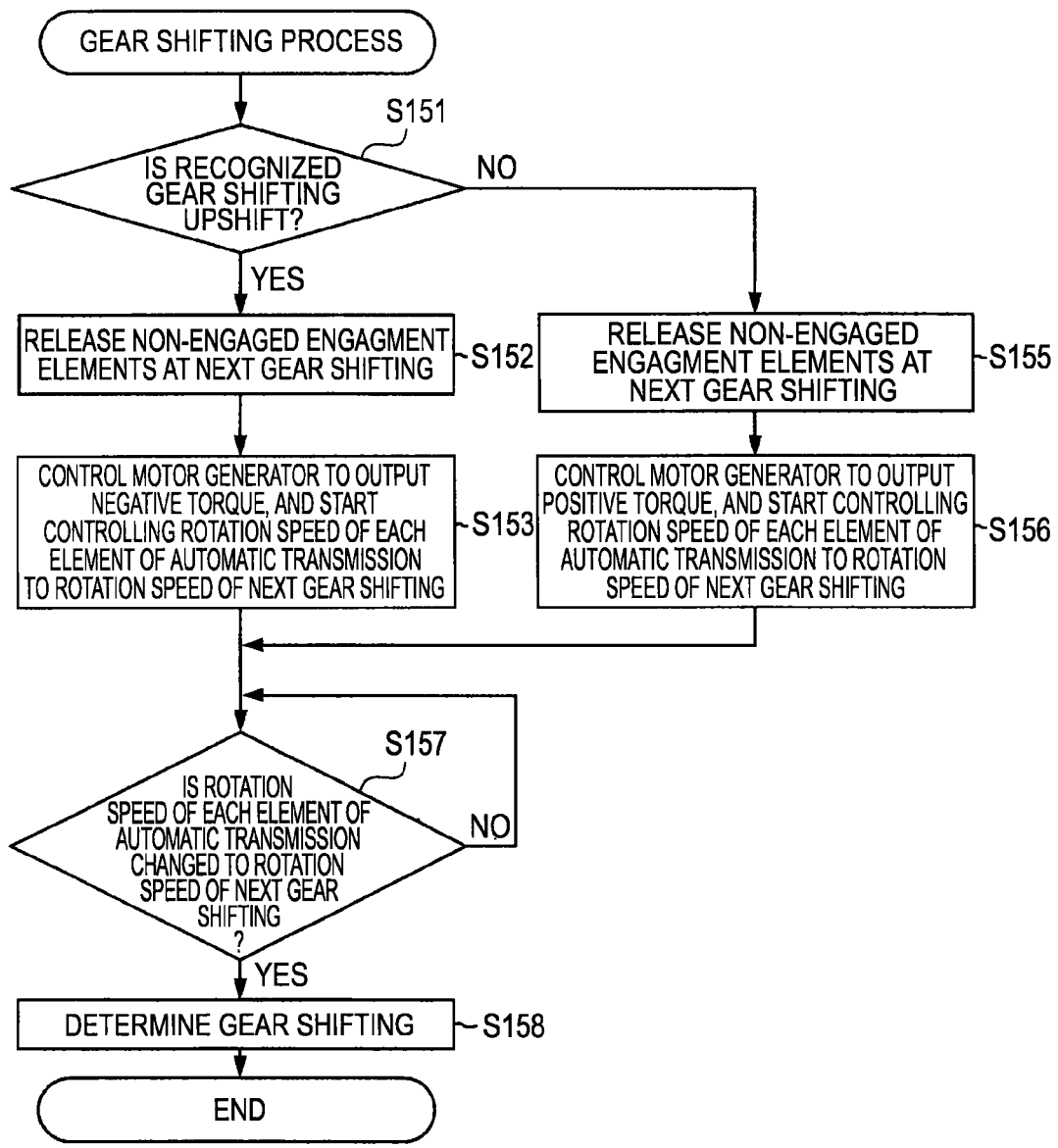
FIG. 10 is a flowchart illustrating a "gear shifting process" which is a sub-routine of the "travelling control process"

When the automatic transmission 4 is shifted, the control unit 10 (gear shifting rotation synchronization unit) sets the rotation speed of each of the rotating elements of the automatic transmission 4 to a rotation speed for the next gear stage by controlling the motor generator 1 based on the input shaft rotation speed Ni detected by the input shaft rotation speed sensor 41-1 and the output shaft rotation speed No detected by the output shaft rotation speed sensor 42-1 (S153 and S156 in FIG. 10). For this reason, the synchronization of rotation by a friction clutch, a friction brake, or a synchronizer mechanism is not required in the automatic transmission 4, and the occurrence of friction loss associated with the synchronization of rotation is prevented, and thereby this results in an improvement in the fuel economy of the drive apparatuses 100 to 300.

When the vehicle 1000 is travelling with the drive force of only the motor generator 1, or when a regenerative braking operation is performed, the clutch 3 disconnects the drive shaft 21 of the engine 2 from the planetary gear mechanism FP, thereby it is possible to prevent the occurrence of friction loss of the engine 2, and the fuel economy of the drive apparatuses 100 to 300 improves.

Since the planetary gear mechanism FP is a single pinion planetary gear mechanism, it is possible to realize a simple structure of the drive apparatus which inputs the drive force of the motor generator 1 to the automatic transmission 4 via the planetary gear mechanism FP.

Another Embodiment

Naturally, the configuration of each of the automatic transmissions 4, 4-2, and 4-3 is not limited to the above-mentioned configuration. Each of the automatic transmissions 4, 4-2, and 4-3 is an automatic transmission having friction engagement elements. However, naturally, the technological concept of this disclosure can be applied to a drive apparatus for a hybrid vehicle equipped with an automated manual transmission (AMT) having a dog clutch or a synchronizer mechanism, a dual clutch automatic transmission (DCT), or a continuous variable transmission (CVT).

When the automatic transmission 4 which is an automated manual transmission is shifted, the motor generator 1 outputs negative torque. Accordingly, the motor generator 1 supports the reaction force of a drive force of the engine, which is input from the engine 2 to the planetary gear mechanism FP, and the drive force of the engine 2 is output to the output shaft 42 without being transmitted to the automatic transmission at all. Accordingly, a neutral state is easily formed before a gear stage is formed in the automatic transmission. When a neutral state is formed and then a gear stage is formed in the automated manual transmission, the motor generator 1 outputs negative toque or positive torque by the same method as in the description above, thereby the rotation speed of each of the rotating elements of the automatic transmission is adjusted to a rotation speed for the next gear stage, and a gear stage is formed.

Each of the drive apparatuses 100 to 300 may separately have a motor and a generator instead of the motor generator 1.

In the embodiments, the planetary gear mechanism FP is a single pinion planetary gear mechanism. However, in the embodiment, the planetary gear mechanism FP is a dual pinion planetary gear mechanism. In the embodiments, the drive shaft 21 of the engine 2 and the input shaft 41 are connected to the ring gear Rf, the rotor 12 of the motor generator 1 and one end of the output shaft 42 are connected to the sun gear Sf, and the rotor 12 and the other end of the output shaft 42 are connected to the carrier Cf.

In the embodiments, each of the drive apparatuses 100 to 300 has the parking brake PB that brings the output shaft 42 into a non-rotatable state. However, the brake device which generates the braking force of the wheels may bring the output shaft 42 into a non-rotatable state.

A first aspect of this disclosure is directed to a drive apparatus for a hybrid vehicle including: an engine that applies a drive force to drive wheels via a drive shaft; a motor that applies a drive force to the drive wheels via a rotation shaft; a planetary gear mechanism that has a first element, a second element, and a third element which line up sequentially with a gap interposed therebetween corresponding to a gear ratio in a speed diagram; and an automatic transmission that has an input shaft, and an output shaft rotatably connected to the drive wheels, and changes a gear ratio that is obtained by the division of the rotation speed of the input shaft by the rotation speed of the output shaft. The input shaft and the drive shaft are connected to the second element, the output shaft and one end of the rotation shaft are connected to the first element, and the output shaft and the other end of the rotation shaft are connected to the third element.

The drive shaft, the rotation shaft, the input shaft, and the output shaft are connected to each of the elements of the planetary gear mechanism that is provided between the automatic transmission, and the engine and the motor. Accordingly, the drive force of the motor is input to the automatic transmission via the planetary gear mechanism. For this reason, the motor can provide an assist drive force for all gear stages without the motor being locked by the gear stages of the automatic transmission. The automatic transmission adjusts a drive force output from the motor to an appropriate torque level.

A second aspect of this disclosure is directed to the drive apparatus for a hybrid vehicle according to the first aspect of this disclosure, wherein the drive apparatus further includes: a locking unit that brings the output shaft into a rotatable state or a non-rotatable state, and an engine starting unit that starts up the engine by driving the motor when the locking unit brings the output shaft into a non-rotatable state.

With this configuration, since the locking unit supports motor torque output from the motor at start-up of the engine, it is possible to start the engine by reliably transmitting the motor torque to the engine, and allowing the motor to rotate the engine. For this reason, a self-starting motor dedicated for starting up the engine is not required. Since the locking unit brings the output shaft into a non-rotatable state, the rotation of the output shaft is prevented from causing a reverse movement of the vehicle at start-up of the engine.

A third aspect of this disclosure is directed to the drive apparatus for a hybrid vehicle according to the first or second aspect of this disclosure, wherein the automatic transmission includes: a plurality of gear stages which have different gear ratios; an input shaft rotation speed sensor that detects the rotation speed of the input shaft; an output shaft rotation speed sensor that detects the rotation speed of the output shaft; and a gear shifting rotation synchronization unit that changes the rotation speed of each rotating element of the automatic transmission to a rotation speed for the next gear stage by controlling the motor based on the rotation speed of the input shaft detected by the input shaft rotation speed sensor and the rotation speed of the output shaft detected by the output shaft rotation speed sensor, when the automatic transmission is shifted.

With this configuration, when the automatic transmission is shifted, the motor changes the rotation speed of each of the rotating elements of the automatic transmission to a rotation speed for the next gear stage. For this reason, the synchronization of rotation by a friction clutch, a friction brake, or a synchronizer mechanism is not required in the automatic transmission, and the occurrence of friction loss associated with the synchronization of rotation is prevented, and thereby this results in an improvement in the fuel economy of the drive apparatus for a hybrid vehicle.

A fourth aspect of this disclosure is directed to the drive apparatus for a hybrid vehicle according to any one of the first to third aspects of this disclosure, wherein the drive apparatus further includes a clutch that connects or disconnects the drive shaft from the second element.

With this configuration, when the vehicle is travelling with the drive force of only the motor, the clutch disconnects the drive shaft of the engine from the second element, thereby it is possible to prevent the occurrence of friction loss of the engine, and the fuel economy of the drive apparatus for a hybrid vehicle improves.

A fifth aspect of this disclosure is directed to the drive apparatus for a hybrid vehicle according to any one of the first to fourth aspects of this disclosure, wherein the planetary gear mechanism is a single pinion planetary gear mechanism, the first element is a sun gear, the second element is a ring gear, and the third element is a carrier.

In the manner described above, since the planetary gear mechanism is a single pinion planetary gear mechanism, it is possible to realize a simple structure of the drive apparatus which inputs the drive force of the motor to the automatic transmission via the planetary gear mechanism.

The automatic transmission preferably has the following configuration to obtain the above-mentioned advantages.

It is preferable that the planetary gear mechanism has a first planetary gear mechanism, a second planetary gear mechanism, and a third planetary gear mechanism, the input shaft is connected to the output shaft via the first planetary gear mechanism, the second planetary gear mechanism, and the third planetary gear mechanism, and a brake is provided so as to brake the rotation of the ring gear of each of the first planetary gear mechanism, the second planetary gear mechanism, and the third planetary gear mechanism.

It is preferable that a clutch that engages and disengages the input shaft from the sun gears is provided between the sun gear of the first planetary gear mechanism connected to the input shaft, and the respective sun gears of the second and third planetary gear mechanisms.

It is preferable that a clutch that engages and disengages the input shaft from the carrier is provided between the sun gear of the first planetary gear mechanism, and the carrier of the second planetary gear mechanism, and preferably.

With these configurations, the motor can provide an assist drive force in all gear stages.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A drive apparatus for a hybrid vehicle comprising:
an engine that applies a drive force to drive wheels via a drive shaft;
a motor that applies a drive force to the drive wheels via a rotation shaft;
a planetary gear mechanism that includes a first element, a second element, and a third element which line up sequentially with a gap interposed therebetween corresponding to a gear ratio in a speed diagram; and an automatic transmission that includes an input shaft, and an output shaft rotatably connected to the drive wheels, and changes a gear ratio that is obtained by a division of a rotation speed of the input shaft by a rotation speed of the output shaft, wherein the input shaft and the drive shaft are connected to the second element, one of the output shaft and the rotation shaft is connected to the first element, and the other of the output shaft and the rotation shaft is connected to the third element, and wherein the planetary gear mechanism is a single pinion planetary gear mechanism, the first element is a sun gear, the second element is a carrier, and the third element is a ring gear, wherein the planetary gear mechanism includes a first planetary gear mechanism, a second planetary gear mechanism, and a third planetary gear mechanism, the input shaft is connected to the output shaft via the first planetary gear mechanism, the second planetary gear mechanism, and the third planetary gear mechanism, and a brake is provided so as to brake the rotation of the ring gear of each of the first planetary gear mechanism, the second planetary gear mechanism, and the third planetary gear mechanism.

2. The drive apparatus for a hybrid vehicle according to claim 1, further comprising:

a locking unit that brings the output shaft into a rotatable state or a non-rotatable state, and an engine starting unit that starts up the engine by driving the motor when the locking unit brings the output shaft into a non-rotatable state.

3. The drive apparatus for a hybrid vehicle according to claim 1, wherein the automatic transmission includes:

a plurality of gear stages which have different gear ratios;

an input shaft rotation speed sensor that detects the rotation speed of the input shaft;

an output shaft rotation speed sensor that detects the rotation speed of the output shaft; and a gear shifting rotation synchronization unit that changes a rotation speed of each rotating element of the automatic transmission to a rotation speed for a next gear stage by controlling the motor based on the rotation speed of the input shaft detected by the input shaft rotation speed sensor and the rotation speed of the output shaft detected by the output shaft rotation speed sensor, when the automatic transmission is shifted.

4. The drive apparatus for a hybrid vehicle according to claim 1, further comprising:

a clutch that connects or disconnects the drive shaft from the second element.

5. The drive apparatus for a hybrid vehicle according to claim 1, wherein a clutch that engages and disengages the input shaft from the sun gears is provided between the sun gear of the first planetary gear mechanism connected to the input shaft, and the respective sun gears of the second and third planetary gear mechanisms.

6. The drive apparatus for a hybrid vehicle according to claim 5, wherein a clutch that engages and disengages the input shaft from the carrier is provided between the sun gear of the first planetary gear mechanism, and the carrier of the second planetary gear mechanism.

* * * * *